(12) United States Patent
Baba et al.

(10) Patent No.: US 8,897,097 B2
(45) Date of Patent: Nov. 25, 2014

(54) SATELLITE SIGNAL RECEIVING DEVICE, SATELLITE SIGNAL RECEIVING METHOD, AND ELECTRONIC DEVICE

(75) Inventors: Norimitsu Baba, Nagano-ken (JP); Katsuyuki Honda, Nagano-ken (JP); Toshikazu Akiyama, Nagano-ken (JP); Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 13/597,872

(22) Filed: Aug. 29, 2012

(65) Prior Publication Data

US 2013/0052944 A1 Feb. 28, 2013

(30) Foreign Application Priority Data

Aug. 30, 2011 (JP) ................. 2011-187487

(51) Int. Cl.
| | |
|---|---|
| G04C 13/00 | (2006.01) |
| G01S 19/24 | (2010.01) |
| G01S 19/34 | (2010.01) |
| H04B 7/19 | (2006.01) |
| G01S 19/26 | (2010.01) |
| G04R 20/04 | (2013.01) |
| G04C 10/02 | (2006.01) |

(52) U.S. Cl.
CPC ............... G01S 19/34 (2013.01); G01S 19/26 (2013.01); G04R 20/04 (2013.01); G04C 10/02 (2013.01)
USPC ........... 368/47; 455/13.2; 455/127.5; 368/53; 342/357.74

(58) Field of Classification Search
CPC ......... G01S 19/26; G01S 19/34; G04R 20/04; G04C 10/02
USPC ......... 455/13.2, 127.1, 127.5; 368/46, 47, 52, 368/53, 67, 71, 203–205; 342/357.62, 342/357.63, 357.65, 357.67, 357.74
See application file for complete search history.

(56) References Cited

U.S. PATENT DOCUMENTS

| | | | |
|---|---|---|---|
| 7,616,153 B2 | 11/2009 | Honda et al. | |
| 2003/0050089 A1* | 3/2003 | Ogino et al. | 455/552 |
| 2004/0048571 A1* | 3/2004 | Kiyose | 455/41.2 |
| 2004/0176127 A1 | 9/2004 | Ballantyne et al. | |
| 2005/0157592 A1 | 7/2005 | Nakamura | |
| 2006/0026650 A1* | 2/2006 | Kim et al. | 725/62 |
| 2007/0117574 A1* | 5/2007 | Watanabe | 455/456.1 |
| 2007/0280164 A1* | 12/2007 | Hayashi et al. | 370/331 |
| 2008/0030403 A1 | 2/2008 | Honda et al. | |
| 2008/0117100 A1* | 5/2008 | Wang et al. | 342/357.02 |
| 2009/0096671 A1* | 4/2009 | Mizuochi | 342/357.12 |

(Continued)

FOREIGN PATENT DOCUMENTS

| | | |
|---|---|---|
| EP | 2 246 710 A1 | 11/2010 |
| JP | 2008-039565 A | 2/2008 |

*Primary Examiner* — Dominic E Rego

(57) ABSTRACT

A satellite signal reception device that can desirably receive satellite signals has a charge state detection circuit 43 and a voltage detection circuit 44 that detect if the satellite signal reception device is outdoors, and a control circuit 40. If the satellite signal reception device is determined to be outdoors based on the detection result from the charge state detection circuit 43 and voltage detection circuit 44, the control circuit 40 operates a GPS reception circuit 30. If an indoor state in which the satellite signal reception device is determined to not be outdoors continues for at least a predetermined specific time, the control circuit 40 operates the GPS reception circuit 30 at a preset scheduled reception time.

17 Claims, 14 Drawing Sheets

(56) References Cited

U.S. PATENT DOCUMENTS

| 2009/0135674 | A1* | 5/2009 | Matsuzaki | 368/14 |
| 2010/0159947 | A1* | 6/2010 | Imafuku | 455/456.1 |
| 2011/0102257 | A1 | 5/2011 | Spyropoulos et al. | |
| 2011/0161885 | A1* | 6/2011 | Gonia et al. | 715/847 |
| 2012/0223860 | A1* | 9/2012 | Leclercq | 342/357.63 |

* cited by examiner

| ILLUMINANCE DETECTION LEVEL | OPEN CIRCUIT VOLTAGE OF SOLAR CELL (V) | ILLUMINANCE (lx) |
|---|---|---|
| 0 | 3.8 | 100 |
| 1 | 4.4 | 500 |
| 2 | 4.8 | 1,000 |
| 3 | 5.0 | 2,000 |
| 4 | 5.2 | 3,000 |
| 5 | 5.4 | 5,000 |
| 6 | 5.5 | 8,000 |
| 7 | 5.6 | 10,000 |
| 8 | 5.8 | 30,000 |
| 9 | 5.9 | 50,000 |
| 10 | 6.2 | 100,000 |

| PRIORITY LEVEL | ILLUMINANCE DETECTION LEVEL | DETECTION TIME | DETECTION COUNT |
|---|---|---|---|
| 1 | 6 | 20:00 | 4 |
| 2 | 6 | 07:00 | 3 |
| 3 | 5 | 17:30 | 3 |
| 4 | 5 | 12:30 | 2 |
| 5 | 4 | 06:30 | 2 |
| 6 | 3 | 05:59 | 2 |

| PRIORITY LEVEL | DETECTION TIME | DETECTION COUNT |
|---|---|---|
| 1 | 7:30 | 32 |
| 2 | 7:15 | 30 |
| 3 | 7:00 | 25 |
| 4 | 12:15 | 20 |
| 5 | 17:30 | 15 |
| 6 | 17:45 | 12 |

FIG.14

| SUCCESS ORDER | TIME OF SUCCESSFUL RECEPTION |
|---|---|
| 1 | 06:10 |
| 2 | 06:15 |
| 3 | 06:40 |
| 4 | 06:00 |
| 5 | 05:59 |
| 6 | 06:15 |
| 7 | 07:02 |
| 8 | 06:50 |
| 9 | 06:10 |
| 10 | 06:08 |

FIG.15

| TIME | ATTEMPTED RECEPTION COUNT | SUCCESSFUL RECEPTION COUNT |
|---|---|---|
| 12:00~12:59 | 0 | 0 |
| 13:00~13:59 | 3 | 0 |
| 14:00~14:59 | 0 | 0 |
| 15:00~15:59 | 0 | 0 |
| 16:00~16:59 | 0 | 0 |
| 17:00~17:59 | 16 | 15 |
| 18:00~18:59 | 14 | 12 |
| 19:00~19:59 | 0 | 0 |
| 20:00~20:59 | 0 | 0 |
| 21:00~21:59 | 0 | 0 |
| 22:00~22:59 | 0 | 0 |
| 23:00~23:59 | 0 | 0 |
| 0:00~0:59 | 0 | 0 |
| 1:00~1:59 | 0 | 0 |
| 2:00~2:59 | 0 | 0 |
| 3:00~3:59 | 0 | 0 |
| 4:00~4:59 | 0 | 0 |
| 5:00~5:59 | 0 | 0 |
| 6:00~6:59 | 24 | 23 |
| 7:00~7:59 | 20 | 20 |
| 8:00~8:59 | 24 | 21 |
| 9:00~9:59 | 2 | 0 |
| 10:00~10:59 | 0 | 0 |
| 11:00~11:59 | 0 | 0 |

FIG.16

| DAY | SUCCESSFUL RECEPTION COUNT |
|---|---|
| MONDAY | 25 |
| TUESDAY | 19 |
| WEDNESDAY | 17 |
| THURSDAY | 16 |
| FRIDAY | 20 |
| SATURDAY | 1 |
| SUNDAY | 0 |

FIG.17

SATELLITE SIGNAL RECEIVING DEVICE, SATELLITE SIGNAL RECEIVING METHOD, AND ELECTRONIC DEVICE

CROSS-REFERENCE TO RELATED APPLICATION

The entire disclosure of Japanese Patent Application No. 2011-187487, filed Aug. 30, 2011 is expressly incorporated by reference herein.

BACKGROUND

1. Technical Field

The present invention relates to a satellite signal receiving device that determines the current position and adjusts the time based on signals received from positioning information satellites such as GPS satellites, to a satellite signal receiving method, and to an electronic device.

2. Related Art

Electronic devices that receive satellite signals from GPS (Global Positioning System) satellites and perform positioning and time adjustment operations are known from the literature. See, for example, Japanese Unexamined Patent Appl. Pub. JP-A-2008-39565.

When the electronic device is a device, such as a wristwatch, that moves with the user, the electronic device could conceivably move to an environment where satellite signals cannot be received, such as indoors or an underground mall.

If the reception process is executed in such an environment where satellite signals cannot be received, power is wasted. Reducing current consumption and avoiding wasteful reception processes are particularly important in battery-powered electronic devices such as wristwatches to assure sufficient duration time and reduce the battery size.

JP-A-2008-39565 therefore describes providing a solar panel in the electronic device, determining if the electronic device is outdoors by comparing the power output of the solar panel with a threshold value for determining if the electronic device is indoors or outdoors, and performing the reception process if determined to be outdoors.

However, solar panel power output corresponds to the illuminance of the light incident to the solar panel. It was therefore thought that an indoor/outdoor determination could be made by obtaining the power output corresponding to the illuminance when the electronic device is outdoors during the day and the illuminance when indoors, and setting the threshold value to differentiate between these power output levels.

However, even if the electronic device is outdoors, power output may not exceed the threshold value depending on the operating conditions of the electronic device. For example, when the electronic device having the satellite signal receiving device is a wristwatch, power output may not exceed the threshold value even though the electronic device is outdoors if the solar cell is covered by a sleeve, for example. Depending upon the season or the weather, power output may also not exceed the threshold value even though the electronic device is outdoors because direct sunlight is not incident or is weak.

SUMMARY

An object of the invention is therefore to provide a satellite signal receiving device, a satellite signal receiving method, and an electronic device that can appropriately receive satellite signals.

A satellite signal reception device according to a preferred aspect of the invention that receives satellite signals transmitted from positioning information satellites includes: a reception circuit that receives satellite signals; an outdoor detection circuit; and a control circuit that controls the reception circuit and the outdoor detection circuit, operates the reception circuit when the control circuit determines the satellite signal reception device is outdoors based on a detection result from the outdoor detection circuit, and operates the reception circuit at a preset scheduled reception time when an indoor state in which the satellite signal reception device is determined not to be outdoors continues for a preset specific time or longer.

In this aspect of the invention, satellite signals are received when the satellite signal reception device is determined to be outdoors, and satellite signals are not received when an indoor state in which the device is determined to not be outdoors does not continue for a specific time or more. As a result, unnecessary power consumption can be reduced because satellite signals are not received in an indoor state in which the possibility of not being able to receive satellite signals is high. On the other hand, when the satellite signal reception device is outdoors but cannot be determined to be outdoors because the satellite signal reception device is covered by a sleeve or because of seasonal or weather-related factors, satellite signals are received at a preset scheduled reception time when an indoor state continues for a specific time or longer. As a result, satellite signals can be received at an appropriate time irrespective of the result of determining the indoor/outdoor location of the satellite signal reception device.

In a satellite signal reception device according to another aspect of the invention, the control circuit stops operation of the outdoor detection circuit when the indoor state continues for the specific time or longer, and operates the reception circuit at the scheduled reception time.

If the indoor state continues for the specific time or longer, the user may be wearing a winter jacket and the satellite signal reception device may be covered with a sleeve everyday, for example. The possibility of detecting that the device is outdoors if the outdoor detection circuit is operated in this situation is low and power is wasted.

Therefore, when the indoor state continues for the specific time or more, the invention reduces unnecessary power consumption by receiving signals only at the scheduled reception time without operating the outdoor detection circuit.

In a satellite signal reception device according to another aspect of the invention, after operating the reception circuit, the control circuit operates the reception circuit when the satellite signal reception device is determined to be outdoors instead of operating the reception circuit at the scheduled reception time even if the indoor state continues for the specific time or longer.

While the operating environment is not considered during reception at the scheduled reception time, the probability of reception succeeding can be improved by appropriately setting the scheduled reception time, and reception with a high probability of success is possible by controlling reception based on the detection result from the outdoor detection circuit.

Because this aspect of the invention controls reception after satellite signals are received based on the detection result of the outdoor detection circuit, which has a higher possibility of success than reception at the scheduled reception time, satellite signals can be received while consuming less power than when both scheduled reception and reception based on the detection result of the outdoor detection circuit are used.

In a satellite signal reception device according to another aspect of the invention, the control circuit sets the time that satellite signal reception performed when the satellite signal reception device is determined to be outdoors succeeds as the scheduled reception time.

The daily pattern of everyday life of the user of the satellite signal reception device is generally substantially the same, and is typically reflected in the indoor/outdoor detection result.

When an indoor state continues for the specific time or longer, this aspect of the invention can improve the probability of successful reception by receiving signals at the time when reception performed when an outdoors location is detected succeeds.

In a satellite signal reception device according to another aspect of the invention, the control circuit operates the reception circuit when a manual reception command is asserted, and sets the time that satellite signal reception initiated by a manual reception command succeeded as the scheduled reception time.

The possibility of success is high when satellite signals are received outdoors. The possibility that the user is outdoors is also high when reception is started manually.

If the user's pattern of daily life is basically the same as described above, and reception is started manually while outdoors while commuting to work, the possibility is high that the user is outdoors at the time reception is started manually.

This aspect of the invention can therefore increase the probability of successful reception by starting reception at the time indicated by past manual reception when the indoor state continues for the specific time or longer.

A satellite signal reception device according to another aspect of the invention preferably also has a storage unit; and the control circuit stores the reception success time in the storage unit, and when a plurality of reception success times are stored, sets the success time with the highest reception success count as the scheduled reception time.

This assumes that the possibility the user is outdoors is high at the time reception succeeds.

By attempting reception at the time with the highest success count selected from among the times when reception succeeded in the past, this aspect of the invention can time reception to when the possibility that the user is outdoors is high, and can thereby increase the probability of reception succeeding.

In a satellite signal reception device according to another aspect of the invention, when satellite signal reception fails at the scheduled reception time, the control circuit sets the success time with the highest success count selected from among the success times other than the success time that was set as the scheduled reception time as the scheduled reception time, and does not change the scheduled reception time when satellite signal reception at the scheduled reception time succeeds.

When reception fails at the scheduled reception time with the highest success count, this aspect of the invention sets the success time with the highest success count selected from among the success times other than the success time that was set as the scheduled reception time as the scheduled reception time, and can therefore increase the probability that reception will succeed the next time even if the user's daily pattern changes.

In a satellite signal reception device according to another aspect of the invention, the control circuit determines which of plural time periods set at a specific time interval contains the success time, and sets a specific time in the time period containing the success time as the scheduled reception time.

This aspect of the invention sets a specific time in the time period containing the success time as the scheduled reception time instead of simply setting the success time directly as the scheduled reception time, and can therefore reduce the number of scheduled reception times to manage. The user can also know the scheduled reception time more easily.

In a satellite signal reception device according to another aspect of the invention, the control circuit starts controlling the reception circuit and outdoor detection circuit at a preset start control time, starts control at the next start control time if the reception circuit is not operated before the next start control time, and if the reception circuit is operated, starts control at a start control time after a predetermined time passes from the next control start time.

When the remaining battery capacity becomes low due to signal reception, this aspect of the invention does not perform reception again for a predetermined set time after the next start control time. As a result, when the satellite signal reception device is used in an electronic device that charges a battery with electrical energy converted by a solar cell, for example, the battery can be charged during the time when reception is not performed, and the problem of running out of power during reception can be suppressed. In addition, when the remaining battery power is high because reception was not performed, reception occurs at the next control start time and satellite signals can be received promptly.

A satellite signal reception device according to another aspect of the invention preferably also has a solar cell; an illuminance detection circuit that detects the illuminance of light incident on the solar cell; and a storage unit. The control circuit operates the illuminance detection circuit at a specific time interval, stores the illuminance detected by the illuminance detection circuit and the detection time of the illuminance in the storage unit, and sets the detection time of the highest illuminance in a specific period as the scheduled reception time.

The higher the illuminance, the more likely the satellite signal reception device will be located where there are few buildings or other objects obstructing satellite signals.

This aspect of the invention increases the probability of successful reception by starting reception at a time when the satellite signal reception device is in a location where there are few obstructions to satellite signals.

In a satellite signal reception device according to another aspect of the invention, when there are plural detection times for the highest detected illuminance, the control circuit sets the detection time of the illuminance that was detected the most times as the scheduled reception time.

By timing reception to the time with the highest reception count selected from among the detection times when illuminance was high in the past, reception can be timed to when the possibility is strong that the user is outdoors, and the probability of successful reception can be improved.

The satellite signal reception device according to another aspect of the invention preferably also has a solar cell; an illuminance detection circuit that detects the illuminance of light incident on the solar cell; and a storage unit. The control circuit operates the illuminance detection circuit at a specific time interval, stores the detection time of the illuminance detected by the illuminance detection circuit in the storage unit when the detected illuminance is greater than or equal to a preset first threshold value, and sets the detection time stored in the storage unit as the scheduled reception time.

This aspect of the invention can increase the probability of successful reception by selecting for reception the detection time when illuminance was greater than or equal to a first threshold value in the past. In addition, by setting the first threshold value to a value enabling detecting that the user is outdoors, reception can be scheduled for a time when the user is outdoors.

In a satellite signal reception device according to another aspect of the invention, when plural detection times are stored, the control circuit sets the detection time at which the illuminance was detected the most times as the scheduled reception time.

By scheduling reception to the time with the highest detection count when there are plural times when the illuminance was greater than or equal to the first threshold value in the past, this aspect of the invention can control reception timed to when the possibility that the user is outdoors is high, and the probability of successful reception can be increased.

In a satellite signal reception device according to another aspect of the invention, the control circuit determines which of plural time periods set at a specific time interval contains the detection time, and stores a specific time in the time period containing the detection time in the storage unit.

This aspect of the invention stores a specific time in the time period containing the detection time as the detection time instead of simply storing the detection time directly, and can therefore reduce the number of scheduled reception times to manage and minimize the required storage capacity in the storage unit. The user can also know the scheduled reception time more easily.

The satellite signal reception device according to another aspect of the invention preferably also has a solar cell. The outdoor detection circuit is an illuminance detection circuit that detects the illuminance of light incident on the solar cell as the detection process detecting if the satellite signal reception device is outdoors; and the control circuit determines that the satellite signal reception device is outdoors when the illuminance detected by the illuminance detection circuit is greater than or equal to a preset second threshold value, and determines the satellite signal reception device is not outdoors when the detected illuminance is less than the second threshold value.

Illuminance differs greatly during the day between indoor light and sunlight.

By determining whether the device is outdoors or not based on the illuminance of light incident on the solar cell, this aspect of the invention can desirably differentiate between outdoors and indoors during the day, and can increase the probability of successful reception.

Another aspect of the invention is a satellite signal reception method for receiving satellite signals transmitted from positioning information satellites, comprising steps of: detecting whether or not a satellite signal reception device is outdoors; receiving the satellite signal when the satellite signal reception device is determined to be outdoors; and receiving the satellite signal at a preset scheduled reception time when an indoor state in which the satellite signal reception device is determined to not be outdoors continues for a preset specific time or longer.

Another aspect of the invention is an electronic device having the satellite signal reception device described above and a battery that stores electrical energy converted by the solar cell, configured so that the reception circuit, illuminance detection circuit, and control circuit are driven by electrical energy stored in the battery.

The satellite signal reception method and electronic device according to the invention have the same operational effect as the satellite signal reception device described above. More particularly, the electronic device according to the invention can receive satellite signals without using an external battery. In addition, because the solar cell is used for both charging and detecting the operating environment, the configuration of the electronic device can be simplified.

BRIEF DESCRIPTION OF THE DRAWINGS

FIG. 14 shows the detection count at each detection time used to set scheduled reception in the fifth embodiment of the invention.

FIG. 15 shows reception success times used to set the scheduled reception time in a first variation.

FIG. 16 shows the relationship between the attempted reception count and the successful reception count in different time periods used to set the scheduled reception time in a second variation.

FIG. 17 shows the relationship between the successful reception count on different days of the week used to set the scheduled reception time in a third variation.

DESCRIPTION OF EMBODIMENTS

Embodiment 1

A first preferred embodiment of the invention is described below with reference to the accompanying figures.

Structure of an Electronic Device

Figure 1:
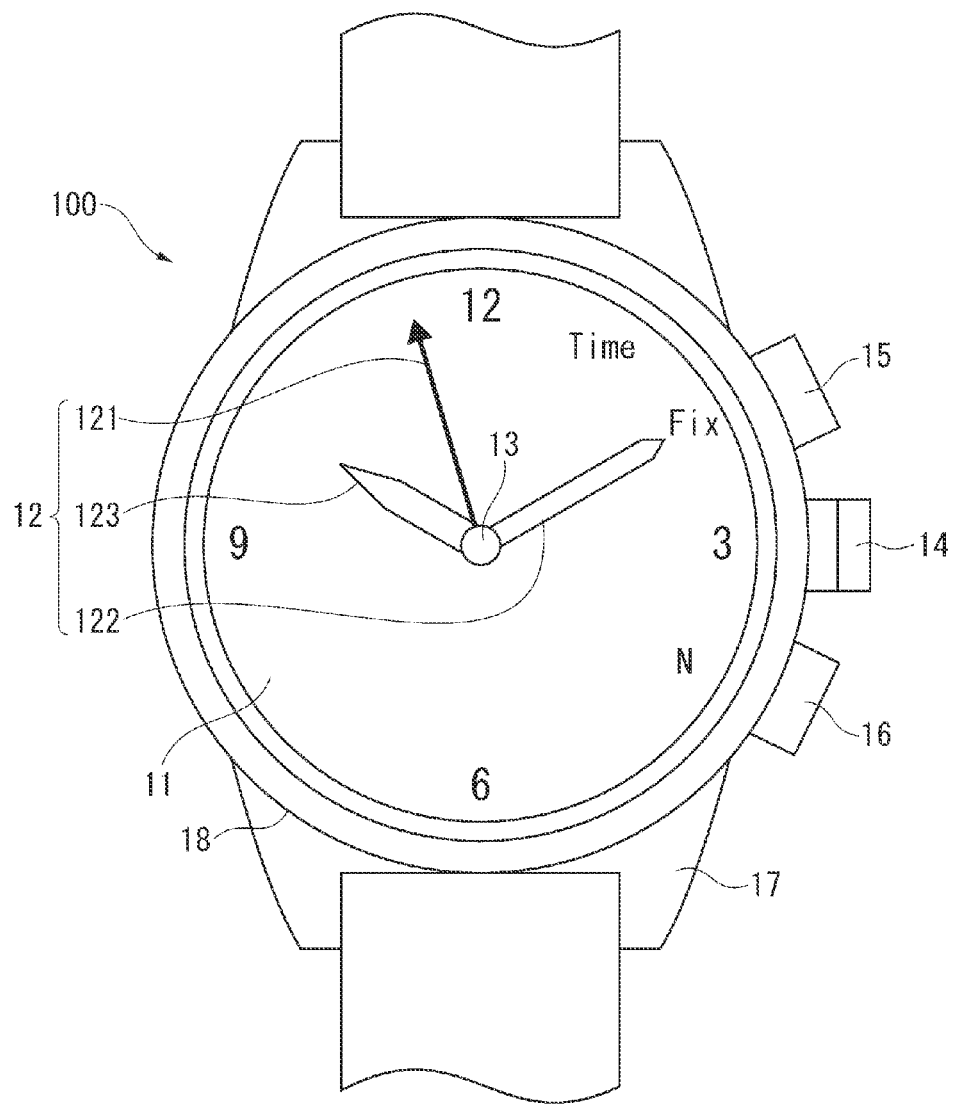
FIG. 1 is a plan view of an electronic device.
Figure 2:
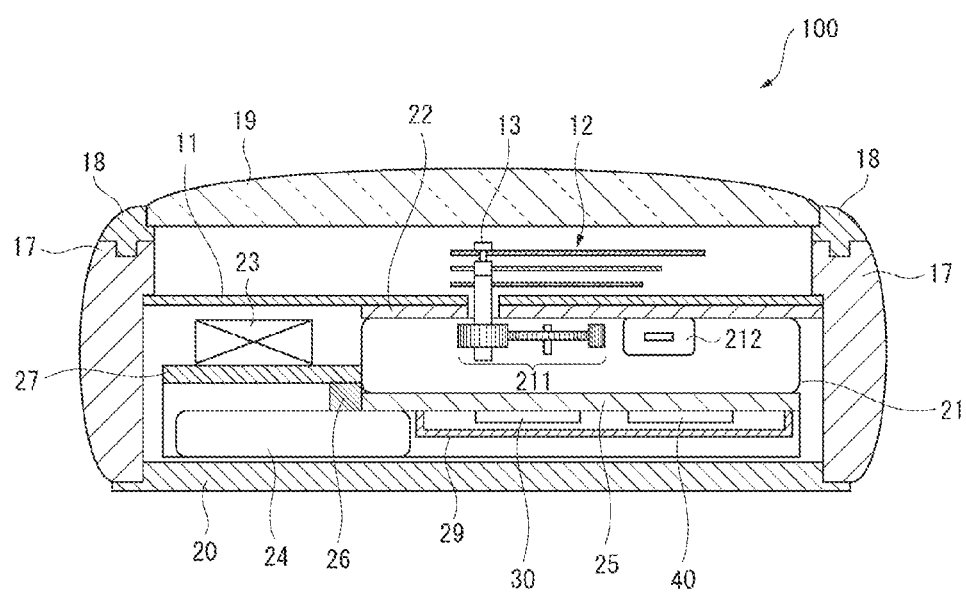
FIG. 2 is a section view of the electronic device.

FIG. 1 is a plan view of a electronic device 100 with a satellite signal receiving device according to a first embodiment of the invention, and FIG. 2 is a section view of the electronic device 100.

As will be understood from FIG. 1, the electronic device 100 is a wristwatch (electronic timepiece) that is worn on the user's wrist, has a dial 11 and hands 12, and keeps and displays time on the face. Most of the dial 11 is made from a non-metallic material (such as plastic or glass) through which light and microwaves in the 1.5 GHz band can pass easily. The hands 12 are disposed on the face side of the dial 11. The hands 12 include a second hand 121, minute hand 122, and hour hand 123 that rotate on a center shaft 13, and are driven by a stepper motor through an intervening wheel train.

The electronic device 100 executes specific processes when the crown 14, button 15, and button 16 are manually operated. More specifically, when the crown 14 is operated, a manual adjustment process that corrects the displayed time according to how the crown 14 is operated is performed. When button 15 is depressed for an extended time (such as 3 or more seconds), a reception process for receiving satellite signals is performed.

When button 16 is pressed, a switching process for changing the reception mode (between a timekeeping mode and a positioning mode) is performed. The second hand 121 jumps to the Time position (5-second position) when the timekeeping mode is selected, and the second hand 121 jumps to the Fix position (10-second position) when the positioning mode is set.

If the button 15 is pressed for a short time, a display result process that displays the result of the previous reception process is performed. For example, the second hand 121 jumps to the Time position (the 5-second position) if reception was successful in the timekeeping mode, and the second hand 121 jumps to the Fix position (10-second position) if reception was successful in the positioning mode. If reception failed, the second hand 121 jumps to the N position (20-second position).

Note that the second hand 121 also moves to these positions during reception. More specifically, the second hand 121 moves to the Time position (the 5-second position) during reception in the timekeeping mode, and the second hand 121 moves to the Fix position (10-second position) during reception in the positioning mode. If a GPS satellite cannot be tracked, the second hand 121 moves to the N position (20-second position).

As shown in FIG. 2, the electronic device 100 has an outside case 17 that is made of stainless steel, titanium, or other metal. The outside case 17 is basically cylindrically shaped. A crystal 19 is attached to the opening on the face side of the outside case 17 by an intervening bezel 18. The bezel 18 is made from a non-metallic material such as ceramic in order to improve satellite signal reception performance. A back cover 20 is attached to the opening on the back side of the outside case 17. Inside the outside case 17 are disposed a movement 21, a solar cell 22, a GPS antenna 23, and a storage battery 24.

The movement 21 includes a stepper motor and wheel train 211. The stepper motor has a motor coil 212, a stator and a rotor, and drives the hands 12 through the wheel train 211 and rotating center shaft 13.

A circuit board 25 is disposed on the back cover 20 side of the movement 21. The circuit board 25 is connected through a connector 26 to an antenna circuit board 27 and the storage battery 24.

A GPS receiver circuit 30 including a receiver circuit for processing satellite signals received through the GPS antenna 23, and a control circuit 40 that controls driving the stepper motor, for example, are mounted on the circuit board 25. The GPS receiver circuit 30 and control circuit 40 are covered by a shield plate 29, and are driven by power supplied from the storage battery 24.

The solar cell 22 is a photovoltaic device that converts light energy to electrical energy and outputs power. The solar cell 22 has an electrode for outputting the produced power, and is disposed on the back cover side of the dial 11. Most of the dial 11 is made from a material through which light passes easily, and the solar cell 22 receives and converts light passing through the crystal 19 and dial 11 to electrical power.

The storage battery 24 is the power supply for the electronic device 100, and stores power produced by the solar cell 22. The two electrodes of the solar cell 22 and the two electrodes of the storage battery 24 can be electrically connected in the electronic device 100, and the storage battery 24 is charged by the photovoltaic power generation of the solar cell 22 when thus electrically connected. Note that this embodiment of the invention uses a lithium ion battery, which is well suited to mobile devices, as the storage battery 24, but the invention is not so limited and lithium polymer batteries or other types of storage batteries, or a storage device other than a storage battery (such as a capacitive device), may be used instead.

The GPS antenna 23 is an antenna that can receive microwaves in the 1.5 GHz band, and is mounted on the antenna circuit board 27 located on the back cover 20 side of the dial 11. The part of the dial 11 overlapping the GPS antenna 23 in the direction perpendicular to the dial 11 is made from a material through which 1.5-GHz microwave signals pass easily (such as a non-metallic material with low conductivity and low magnetic permeability). The solar cell 22 with electrodes does not intervene between the GPS antenna 23 and the dial 11. The GPS antenna 23 can therefore receive satellite signals passing through the crystal 19 and the dial 11.

The closer the distance between the GPS antenna 23 and the solar cell 22, loss can result from electrical connection between metal components of the GPS antenna 23 and the solar cell 22, and the radiation pattern of the GPS antenna 23 may be blocked by the solar cell 22 and become smaller. The GPS antenna 23 and solar cell 22 are therefore disposed with at least a specific distance therebetween in this embodiment of the invention to prevent a drop in reception performance.

The GPS antenna 23 is also disposed with at least a specific distance to metal parts other than the solar cell 22. For example, if the outside case 17 and movement 21 contain metal parts, the GPS antenna 23 is disposed so that the distance to the outside case 17 and the distance to the movement 21 is at least this specific distance. Note that a patch antenna (microstrip antenna), helical antenna, chip antenna, or inverted F-type antenna, for example, could be used as the GPS antenna 23.

The GPS receiver circuit 30 is a load that is driven by power stored in the storage battery 24, attempts to receive satellite signals from the GPS satellites through the GPS antenna 23 each time the GPS receiver circuit 30 is driven, supplies the acquired orbit information, GPS time information, and other information to the control circuit 40 when reception succeeds, and sends a failure report to the control circuit 40 when reception fails. Note that the configuration of the GPS receiver circuit 30 is the same as the configuration of a GPS receiver circuit known from the literature, and description thereof is omitted.

Figure 3:
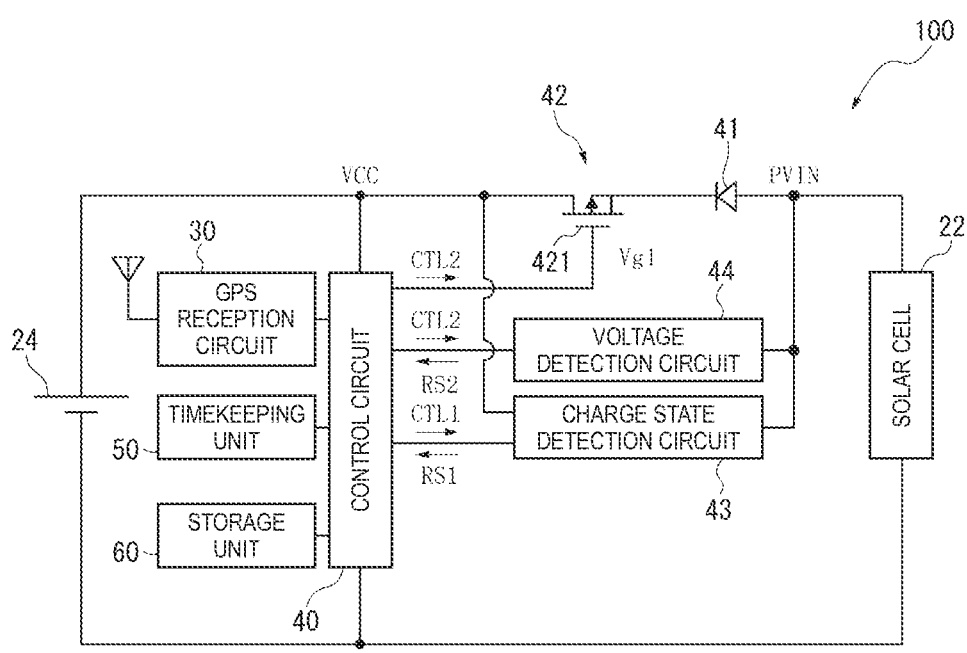
FIG. 3 is a block diagram showing the circuit configuration of the electronic device.

FIG. 3 is a block diagram showing the circuit configuration of the electronic device 100. As shown in this figure, the electronic device 100 has a solar cell 22, storage battery 24, GPS receiver circuit 30, control circuit 40, diode 41, charging control switch 42, charge state detection circuit 43, voltage detection circuit 44, timekeeping unit 50, and storage unit 60. Note that an illuminance detection circuit used as an outdoor detection circuit of the invention includes the charge state detection circuit 43 and voltage detection circuit 44.

The control circuit 40 includes a CPU for controlling an electronic device 100 with a satellite signal receiving device. As described below, the control circuit 40 controls the GPS receiver circuit 30 and executes a reception process. The control circuit 40 also controls operation of the charge state detection circuit 43 and voltage detection circuit 44.

Diode 41 is disposed to a path that electrically connects the solar cell 22 and storage battery 24, and blocks current from the storage battery 24 to the solar cell 22 (reverse current) without blocking current from the solar cell 22 to the storage battery 24 (forward current). Note that forward current flow is limited to when the solar cell 22 voltage is greater than the storage battery 24 voltage, that is, while charging. A field-effect transistor (FET) may also be used instead of a diode 41.

The charging control switch 42 closes and opens the current path from the solar cell 22 to the storage battery 24, and includes a switching device 421 disposed to a path that electrically connects the solar cell 22 and storage battery 24. The charging control switch 42 turns on (closes) when the switching device 421 switches from the off state to the on state, and turns off (opens) when the switching device 421 switches from the on state to the off state.

For example, to prevent the battery voltage of the storage battery 24 from going above a specific level so that battery characteristics do not deteriorate as a result of overcharging, the charging control switch 42 is turned off.

The switching device 421 is a p-channel transistor that turns off when the gate voltage Vg1 is LOW and turns on when HIGH. The gate voltage Vg1 is controlled by the control circuit 40.

The charge state detection circuit 43 operates based on a binary control signal CTL1 that specifies the charge state detection timing, detects the state of charging from the solar cell 22 to the storage battery 24 (the charge state), and outputs detection result RS1 to the control circuit 40. The charge state is either "charging" or "not charging", and charge state detection is based on the battery voltage VCC and PVIN from the solar cell 22 when the charging control switch 42 is ON. For example, if the voltage drop of the diode 41 is Vth and the ON resistance of the switching device 421 is ignored, "charging" can be determined when PVIN−Vth>VCC, and "not charging" can be determined when PVIN−Vth≤VCC.

In this embodiment of the invention the control signal CTL1 is a pulse signal with a 1-second period, and the charge state detection circuit 43 detects the charge state when the control signal CTL1 is HIGH. More specifically, the charge state detection circuit 43 repeatedly detects the charge state on a 1-second period while the charging control switch 42 remains closed.

Note that the charge state is detected intermittently to reduce the power consumption of the charge state detection circuit 43. If this reduction is not necessary, the charge state may be detected continuously. The charge state detection circuit 43 can be configured using a comparator or A/D converter, for example.

The voltage detection circuit 44 operates based on a binary control signal CTL2 that specifies the voltage detection timing, and detects the terminal voltage PVIN of the solar cell 22, that is, the open circuit voltage of the solar cell 22, when the charging control switch 42 is turned off by the control signal CTL2. The voltage detection circuit 44 outputs the detection result RS2 of the open circuit voltage to the control circuit 40.

The timekeeping unit 50 includes the movement 21, is driven by power stored in the storage battery 24, and runs a timekeeping process. This timekeeping process both keeps the time and displays the time corresponding to the kept time (the display time) on the face of the electronic device 100.

The storage unit 60 stores various information. The storage capacity of the storage unit 60 can be determined according to the number of types of information and the amount of information stored.

Control Circuit Operation

Figure 4:
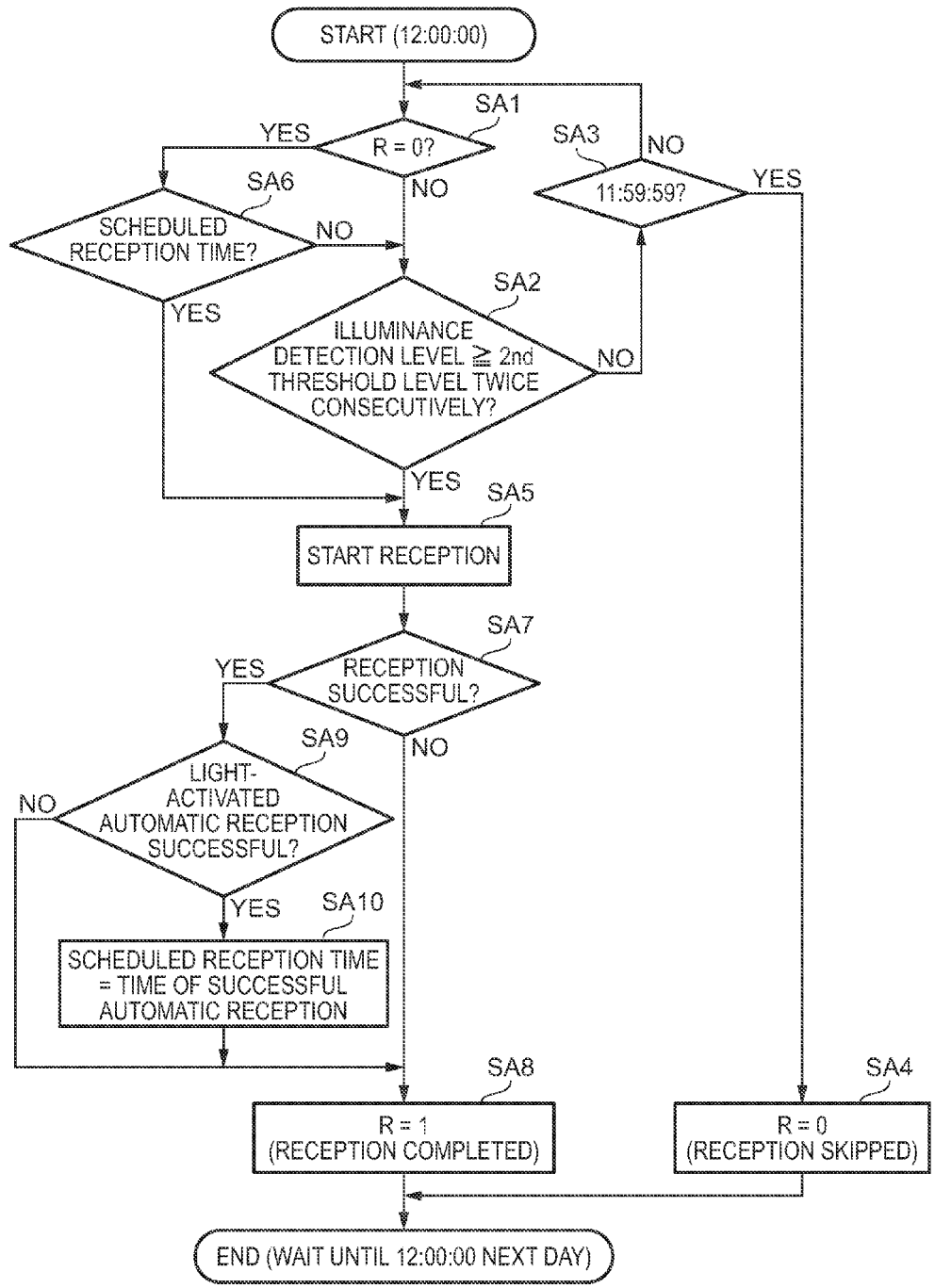
FIG. 4 is a flow chart of a satellite signal reception process executed by the control circuit in a first embodiment of the invention.
Figure 5:
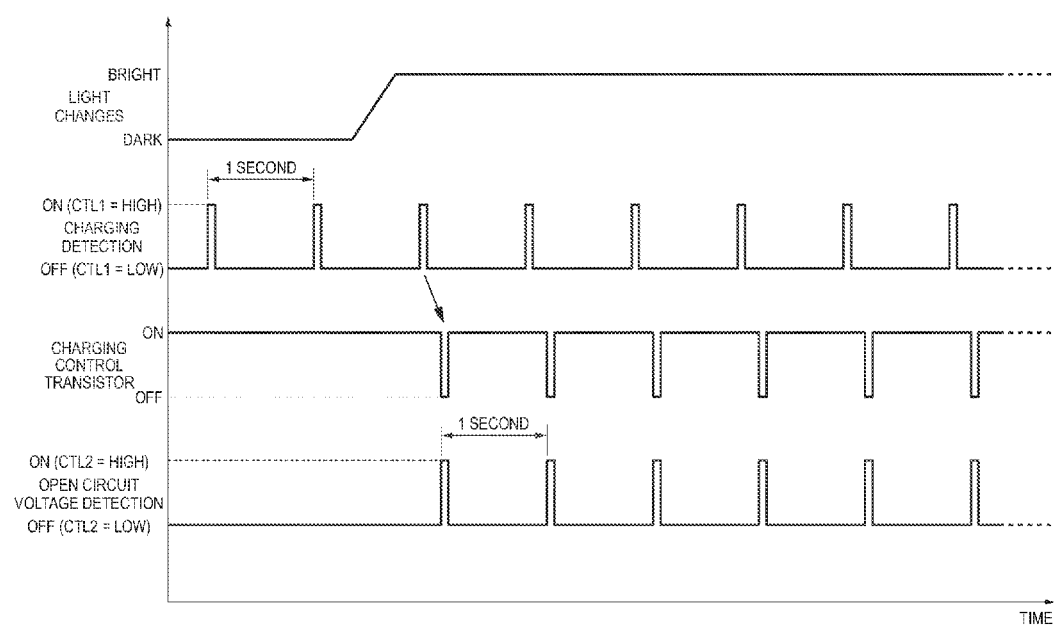
FIG. 5 is a timing chart of charge state detection and open circuit voltage detection.
Figures 6, 7:
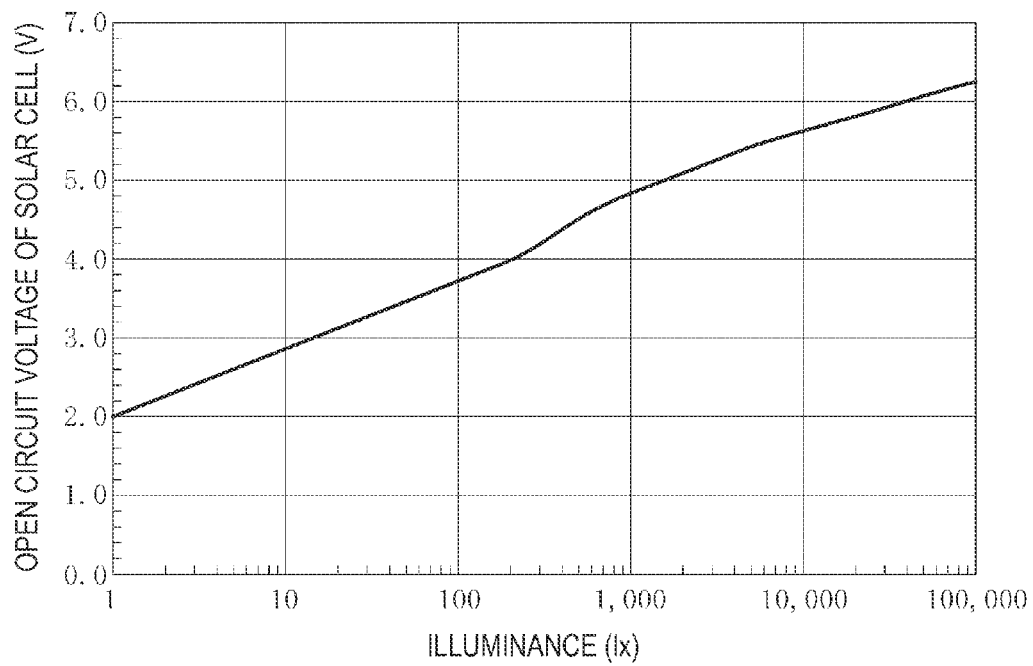
FIG. 6 is a graph showing the relationship between the illuminance of light incident on the solar cell of the electronic device, and the open circuit voltage of the solar cell.
FIG. 7 shows the relationship between the open circuit voltage of the solar cell and the illuminance of light incident on the solar cell at different illuminance detection levels.

FIG. 4 is a flow chart of the satellite signal reception process of the control circuit in the first embodiment of the invention. FIG. 5 is a timing chart of charge state detection, open circuit voltage detection, and the reception process. FIG. 6 is a graph showing the relationship between the illuminance of light incident on the solar cell of the electronic device, and the open circuit voltage of the solar cell. FIG. 7 shows the relationship between the open circuit voltage of the solar cell and the illuminance of light incident on the solar cell at different illuminance detection levels.

The operation of the control circuit 40 in this electronic device 100 is described below based on the flow chart in FIG. 4.

The control circuit 40 starts the control process at 12:00:00 daily. The control circuit 40 first determines if a variable R=0 (SA1). This variable R is set to 1 if the satellite signal reception process was performed any time within a specific period of time, which is 24 hours in this embodiment of the invention, regardless of whether or not reception was successful. However, if the reception process was not performed even once in this 24-hour period, that is, if the location of the electronic device 100 is determined to be indoors and the indoor state continues for 24 hours or more, the variable R is set to 0. Note that this specific time is not limited to 24 hours and can be set to any desired time, but is usually preferably set to a time of half a day or longer, such as a half day (12 hours), 1 day (24 hours), or 2 days (48 hours).

If SA1 returns No (variable R=1, the reception process ran during the specific period of time), the control circuit 40 determines if the illuminance detection level of the open circuit voltage corresponding to the illuminance of light incident on the solar cell 22 is greater than or equal to a second threshold level, which is the threshold value, twice consecutively (SA2). More specifically, if the reception process ran within the specific period of time, the control circuit 40 starts the satellite signal reception process based on the illuminance of light incident on the solar cell 22 (light-activated automatic reception process) as described in further detail below.

More specifically, as shown in FIG. 5, the control circuit 40 outputs the control signal CTL1 at a 1-second interval and drives the charge state detection circuit 43 on a regular cycle. When the control signal CTL1 is input, the charge state detection circuit 43 outputs detection result RS1 indicating if charging is in progress to the control circuit 40. The control circuit 40 thus determines if charging is in progress or not. Note that as described below the charging control switch 42 turns off only at the time the voltage detection circuit 44 operates. Note that the charging state is detected at a 1-second interval in this example, but the invention is not limited to this interval, and a period of 0.5 s, 10 s, or 1 minute could be used, for example.

When the electronic device 100 is exposed to low level light and the solar cell 22 is not producing power, the charge state detection circuit 43 outputs a not-charging detection result RS1 to the control circuit 40. In this case the control circuit 40 determines that charging is not in progress (SA2 returns No), and the control circuit 40 outputs the control signal CTL2 LOW.

Therefore, when it is determined that charging is not in progress, the control circuit 40 can determine that the likelihood is high that the electronic device 100 is not outdoors and not in a place suited to GPS signal reception.

If the control circuit 40 determines that the battery is being charged, it operates the voltage detection circuit 44. In this case, as described above, the control circuit 40 turns the charging control switch 42 off. More specifically, when the charge state detection circuit 43 detects that charging is in progress, the control circuit 40 outputs the control signal CTL2 at a 1-second interval and operates the voltage detection circuit 44. Because the charging control switch 42 is turned off by the control signal CTL2 from the control circuit 40, the solar cell 22 and voltage detection circuit 44 are cut off from the storage battery 24. As a result, the voltage detection circuit 44 can detect the open circuit voltage corresponding to the illuminance of light incident on the solar cell 22 without being affected by the charge voltage of the storage battery 24.

Note that when the charging control switch 42 is off, the charge state cannot be detected by the charge state detection circuit 43. As a result, the control circuit 40 shifts the output timing of the control signal CTL1 and control signal CTL2 so that the output timing of the control signal CTL1 to the charge state detection circuit 43, and the output timing of the control signal CTL2 to the voltage detection circuit 44, do not match.

In this embodiment of the invention the open circuit voltage detected by the voltage detection circuit 44 increases as the illuminance of light on the solar cell 22 increases as shown in FIG. 6.

Note that a configuration that detects the illuminance of light on the solar cell 22 by detecting the short-circuit current of the solar cell 22 instead of the open circuit voltage of the solar cell 22 may be used as the voltage detection circuit 44.

The control circuit 40 determines the illuminance detection level corresponding to the open circuit voltage from the detection result RS2 output from the voltage detection circuit 44. In this embodiment of the invention the control circuit 40 determines the illuminance detection level based on the relationship shown in FIG. 7. Note that the open circuit voltage and illuminance values shown in FIG. 7 represent the lower limit of each illuminance detection level. For example, when the open circuit voltage is greater than or equal to 5.6 V and less than 5.8 V, the control circuit 40 determines the illuminance detection level is 7, and when the open circuit voltage is greater than or equal to 5.9 V and less than 6.2 V, determines the illuminance detection level is 9.

The control circuit 40 thus determines in step SA2 if the illuminance detection level acquired from the detection result RS2 is greater than or equal to the second threshold level, which is preset as a second threshold value, twice consecutively based on voltage detection at a 1-second interval.

The relationship between the illuminance detection level and the open circuit voltage of the solar cell is preset based on the relationship shown in FIG. 7. That is, the threshold value for determining if the illuminance detection level of the illuminance of light incident on the solar cell 22 is a high illuminance level that is greater than or equal to a preset second threshold level, or is a low illuminance level below the second threshold level, is set as shown in this figure. However, the relationship between the illuminance detection level and the open circuit voltage of the solar cell is not limited to the relationship shown in FIG. 7, and can be set desirably.

The illuminance of the light incident to the solar cell 22 under fluorescent lights is normally 500 to 1000 lux while the illuminance of the light when the solar cell 22 is exposed to daylight on a cloudy day is normally about 5000 lux. As a result, illuminance detection level 5 corresponding to light of 5000 lux on the solar cell 22 is set as the second threshold level.

The second threshold level may also be set to a level other than 5. In addition, when the illuminance detection level remains less than the second threshold level continuously for a specific time or more, the second threshold level could be reset to one level lower to loosen the conditions for operating the GPS reception circuit 30. By thus resetting the second threshold level lower, the illuminance detection level more easily goes to the second threshold level or above, and opportunities to operate the GPS reception circuit 30 can be created.

When the solar cell 22 deteriorates and its power conversion efficiency drops, the open circuit voltage becomes even lower even when the solar cell 22 is exposed to light of the same illuminance, and the illuminance detection level determined by the control circuit 40 also drops. If the second threshold level remains constant in such cases, the control circuit 40 will be unable to appropriately determine if the electronic device 100 is located outdoors or not, and problems result.

As described above, if the second threshold level is lowered, an opportunity to operate the GPS reception circuit 30 can be created even if the illuminance detection level only goes to less than or equal to 4, which is lower than the 5 set here as the second threshold level, when exposed to light of 5000 lux because deterioration of the solar cell 22 has advanced.

If SA2 returns No (the light level is low), the control circuit 40 can determine that the likelihood is high that the electronic device 100 is not outdoors and is not in a location suited to GPS reception.

More specifically, if the electronic device 100 is outdoors during the day, light exceeding the second threshold level should be continuously incident to the solar cell 22 for more than 1 second. Therefore, if the open circuit voltage is detected at a 1-second interval and an open circuit voltage exceeding the second threshold level is detected twice consecutively, the likelihood is high that the electronic device 100 is outdoors.

However, if open circuit voltage exceeding the second threshold level cannot be detected twice consecutively, the open circuit voltage may not go to the second threshold level even once because the person wearing the wristwatch that is the electronic device 100 is moving around indoors, or may not go to the second threshold level twice consecutively because direct sunlight hit the solar cell 22 momentarily through an office window, for example. Receiving GPS satellite signals with good sensitivity is difficult under such circumstances.

This embodiment of the invention therefore determines in SA2 if the illuminance detection level is greater than or equal to the second threshold level twice consecutively. Note that this decision is not limited to determining if the illuminance detection level is greater than or equal to the second threshold level twice consecutively. For example, if determining whether the user is outdoors more accurately is desired, the determining criteria could be whether the illuminance detection level is greater than or equal to the second threshold level three times consecutively.

When SA2 returns No, whether the current time is before 11:59:59 on the day after the day that the control circuit 40 started control is determined (SA3). This enables the control circuit 40 to determine if the preset specific time has passed without executing the reception process. This specific time in this example is 24 hours. If SA3 returns No, control returns to SA1, and the charge state detection circuit 43 operates on a regular cycle.

However, if SA3 returns Yes (the specific time has passed), variable R is set to 0 (SA4), the process ends, and a standby mode is entered until the restart control time at which the control circuit 40 next starts the process. The restart control time in this example is 1-second later at 12:00:00.

If SA2 returns Yes, conditions can be considered suitable for receiving GPS satellite signals as described above, and the control circuit 40 therefore operates the GPS reception circuit 30 and starts receiving GPS satellite signals (SA5).

The reception process started in SA5 after SA2 returns Yes is the light-activated automatic reception process or a scheduled reception process. Note that the light-activated automatic reception process and the scheduled reception process are collectively referred to below as simply an "automatic reception process." The reception process is executed in the timekeeping mode in this automatic reception process. The reception process takes longer in the positioning mode because signals must be received from three or more GPS satellites in order to determine the position. As a result, the electronic device 100 is preferably kept outdoors until signal reception ends, but the user may not realize that reception is in progress in the automatic reception process and may move indoors during reception. As a result, reception in the positioning mode is preferably done only when the user intentionally starts reception, that is, only in a manual reception process.

In the timekeeping mode, however, time information can be acquired by receiving signals from one GPS satellite, and the length of the reception process can be shortened. The reception process can therefore be executed in the timekeeping mode even when not specifically intended by the user, and is suited to an automatic reception process.

Furthermore, because reception sensitivity is affected if the hands 12 are over the antenna circuit board 27 during the reception process, the motor is preferably controlled so that the hands 12 do not overlap the antenna circuit board 27.

If SA1 returns Yes (variable R=0, and the reception process was not performed in the specific time), the control circuit 40 determines if the current time is the preset scheduled reception time (SA6). As described in detail below, the scheduled reception time is the time reception started when the light-activated automatic reception process was successful (the "reception start time" below), and is stored in storage unit 60.

Note that the scheduled reception time could be the time that reception ended (the "reception end time").

In addition, if the system was reset and the scheduled reception time is not stored in the storage unit 60, step SA6 could be executed using a default time as the scheduled reception time, or it could be decided to skip the scheduled reception process because that the current time is not the scheduled reception time (SA6 returns No).

If SA6 returns No, the control circuit 40 goes to SA2. If SA6 returns Yes, the control circuit 40 goes to SA5.

If the reception process was not performed within the specific time, and the current time is not the scheduled reception time, the control circuit 40 determines if the light-activated automatic reception process can be performed. If the current time is the scheduled reception time, the control circuit 40 unconditionally executes the satellite signal reception process at the scheduled time regardless of the intensity of light incident on the solar cell 22.

The control circuit 40 then determines if the reception process started in SA5 succeeded in receiving a GPS signal (SA7).

Note that the GPS reception circuit 30 first looks for a GPS satellite, and the GPS reception circuit 30 detects a GPS signal. If a GPS signal was detected, receiving the GPS signal continues to receive the time information. If the time information can be received, receiving a GPS signal by the reception process is determined successful. Otherwise, that is, if the GPS reception circuit 30 could not detect a GPS signal, or the time information could not be received, the reception process is determined to have failed in receiving a GPS signal.

In addition, if the reception process is determined to have failed in receiving a GPS signal (SA7 returns No), the control circuit 40 sets the variable R to 1, ends the process (SA8), and enters a standby mode until 12:00:00 the next day, which is the restart control time.

Note that if SA7 returns No, the second threshold level could be reset to one level higher. Setting the second threshold level one level higher makes it more difficult for the detection level to go the second threshold level or above when the process resumes from SA1 at 12:00:00 the next day. More specifically, when an electronic device 100 located indoors is exposed to extremely intense light and the reception process is executed because the detection level is greater than or equal to the second threshold level, the second threshold level is increased one level because reception fails. By thus increasing the second threshold level one level at a time, the detection level will eventually not rise to the second threshold level under the indoor lighting, and will only go to the second threshold level or above when outdoors exposed to direct sunlight. The second threshold level can thus be optimized according to how the person using the electronic device 100 lives. By thus making the conditions for operating the GPS reception circuit 30 stricter when the GPS reception circuit 30 fails at receiving the GPS signal, the GPS reception circuit 30 can be operated in an environment that is suited to receiving GPS signals.

When the reception process is determined to have succeeded at receiving the GPS signal (SA7 returns Yes), the control circuit 40 determines whether the signal was received in a light-activated automatic reception process (SA9). If the light-activated automatic reception process succeeded (SA9 returns Yes), the control circuit 40 deletes the scheduled reception time stored in the storage unit 60, stores the time that the current successful light-activated automatic reception process started (automatic reception success time) as the scheduled reception time in the storage unit 60 (SA10), and goes to step SA8.

However, if scheduled reception was successful (SA9 returns No), the control circuit 40 skips step SA10 and goes to step SA8.

Note that even if the automatic reception success time is 12:00:30 in step SA10, the control circuit 40 stores 12:00:00 as the scheduled reception time. More specifically, before storing the automatic reception success time as the scheduled reception time, whether the automatic reception success time is contained in any one of plural time periods set at 1-minute intervals is determined, and a specific time in that time period is stored as the automatic reception success time. For example, if the automatic reception success time is in the time period from 12:00:00 to 12:00:59, the value of the seconds unit of the time period is dropped and the time of 12:00:00 is set as the scheduled reception time.

The effects of this first embodiment of the invention are described below.

When the illuminance detection level of the open circuit voltage detected by the voltage detection circuit 44 is greater than or equal to a second threshold level twice consecutively, the control circuit 40 determines that the electronic device 100 is located outdoors and receives a satellite signal. However, if an indoor state is determined to continue for a specific time of 24 hours, the satellite signal is received at a predetermined scheduled reception time.

Wasteful power consumption can therefore be suppressed because satellite signals are not received when indoors where the likelihood of reception failing is high. In addition, if an outdoors location cannot be determined even though the electronic device 100 is outdoors because the electronic device 100 is covered by a sleeve, for example, and an indoor state continues for 24 hours or more, a satellite signal is received at a predetermined scheduled reception time. As a result, a satellite signal can be received at a suitable time regardless of where the electronic device 100 is determined to be.

The control circuit 40 also sets the variable R to 1 if the light-activated automatic reception process or scheduled reception process is performed. If the variable R is 1 at the time of the next process, the control circuit 40 performs only the light-activated automatic reception process and does not perform the scheduled reception process.

Because only the light-activated automatic reception process, which has a higher likelihood of success than the scheduled reception, is therefore performed as the reception process the next day, the satellite signal can be received with less power consumption than when both scheduled reception and light-activated automatic reception processes are performed.

The control circuit 40 also sets the time of a successful past light-activated automatic reception process as the scheduled reception time.

As a result, the scheduled reception time can be set according to the user's everyday pattern of life, and the probability of successful reception can be improved. More particularly, by setting the time that the last light-activated automatic reception process succeeded as the scheduled reception time, reception is possible at a time reflecting the most recently daily pattern.

The outdoor detection circuit includes a charge state detection circuit 43 that detects the illuminance of light incident on the solar cell 22, and a voltage detection circuit 44.

As a result, indoor and outdoor locations can be appropriately differentiated during the day, and the probability of successful reception can be improved.

Instead of storing the automatic reception success time directly as the scheduled reception time, the control circuit 40 stores a specific time in a time period containing the automatic reception success time as the automatic reception success time.

This enables the user to more easily know the scheduled reception time.

Furthermore, because the control circuit 40 operates the voltage detection circuit 44 only when charging is detected by the charge state detection circuit 43, the voltage detection circuit 44 is not operated when not charging, that is, when light is not incident to the solar cell 22, and wasteful power consumption can be prevented.

Because the charge state detection process of the charge state detection circuit 43 is performed at 1-second intervals, and the power generation detection process of the voltage detection circuit 44 is only performed when the charge state detection circuit 43 determines that charging is in progress, the operating time of the voltage detection circuit 44, that is, the time that the charging control switch 42 is off, can be minimized. As a result, a drop in the charging efficiency of the solar cell 22 can be suppressed.

Embodiment 2

A second embodiment of the invention is described next with reference to the accompanying figures.

Note that the configuration of the electronic device according to this embodiment of the invention is the same as that of the first embodiment, and further detailed description thereof is omitted or simplified.

Figure 8:
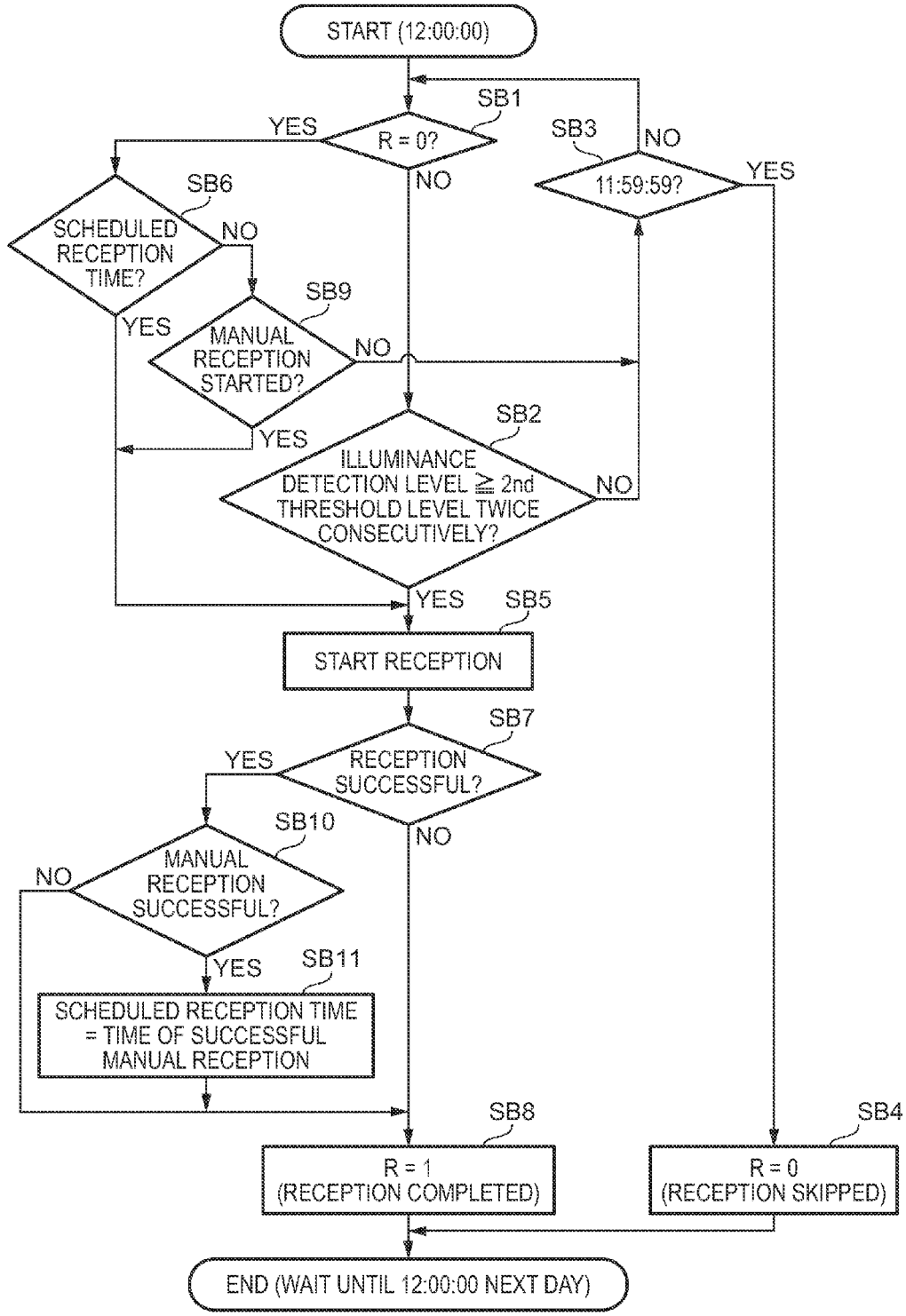
FIG. 8 is a flow chart of a satellite signal reception process executed by the control circuit in a second embodiment of the invention.

FIG. 8 is a flow chart of the satellite signal reception process that is executed by the control circuit in a second embodiment of the invention.

This embodiment differs from the foregoing first embodiment in that: (i) the scheduled reception time is the time reception started when manual reception succeeded, and (ii) the charge state detection circuit 43 and voltage detection circuit 44 are not operated when variable R=0 (reception was not attempted).

Manual reception refers to reception when the user intentionally presses button 15 used as an operator to start reception. Also note that steps SB1 to SB8 of the control circuit 40 are the same as steps SA1 to SA8 in the first embodiment.

As shown in FIG. 8, when steps SB1 to SB6 are executed, the control circuit 40 starts scheduled reception (SB5) if SB6 returns Yes (the current time is the scheduled reception time), and determines if the operation to start reception manually was performed (SB9) if SB6 returns No (the current time is not the scheduled reception time).

The control circuit 40 starts manual reception (SB5) if SB9 returns Yes, and goes to step SB3 if SB9 returns No. More specifically, if the reception process is not performed within the specific period of time, the charge state detection circuit 43 and voltage detection circuit 44 are not operated so that the light-activated automatic reception process is not executed, and only scheduled reception or manual reception is performed.

If reception is determined successful in SB7, the control circuit 40 determines if it was manual reception that succeeded (SB10). If the successful reception is determined to have been manual reception (SB10 returns Yes), the scheduled reception time stored in the storage unit 60 is deleted and the start time of the manual reception process that succeeded this time (manual reception success time) is stored in the storage unit 60 (SB11), and control goes to step SB8. If the reception process was a light-activated automatic reception process or scheduled reception (SB10 returns No), step SB11 is skipped and control goes directly to step SB8.

Note that the control circuit 40 does not store the manual reception success time directly as the scheduled reception time, and instead stores a specific time for the time period containing the manual reception success time as the manual reception success time. These time periods may be set at one minute intervals as in the first embodiment, or at a different interval.

This second embodiment of the invention has the operating effects described below in addition to the same effects as the first embodiment.

If an indoor state continues for 24 hours and the variable R is 0, the control circuit 40 does not operate the charge state detection circuit 43 and voltage detection circuit 44 so that the light-activated automatic reception process does not run, and executes only the scheduled reception process.

As a result, satellite signals can be received without performing an unnecessary detection process due to the light-activated automatic reception process.

The control circuit 40 stores the time that manual reception succeeded in the past as the scheduled reception time.

This is based on the assumption that the user starts manual reception while outdoors so that reception will succeed. As a result, the likelihood that the user is outdoors is high when reception is started manually. The probability of reception succeeding can therefore be increased by scheduling reception for the time when reception was manually started in the past.

Third Embodiment

A third embodiment of the invention is described next with reference to the accompanying figures.

Note that the configuration of the electronic device according to this embodiment of the invention is the same as that of the first embodiment, and further detailed description thereof is omitted or simplified.

Figure 9:
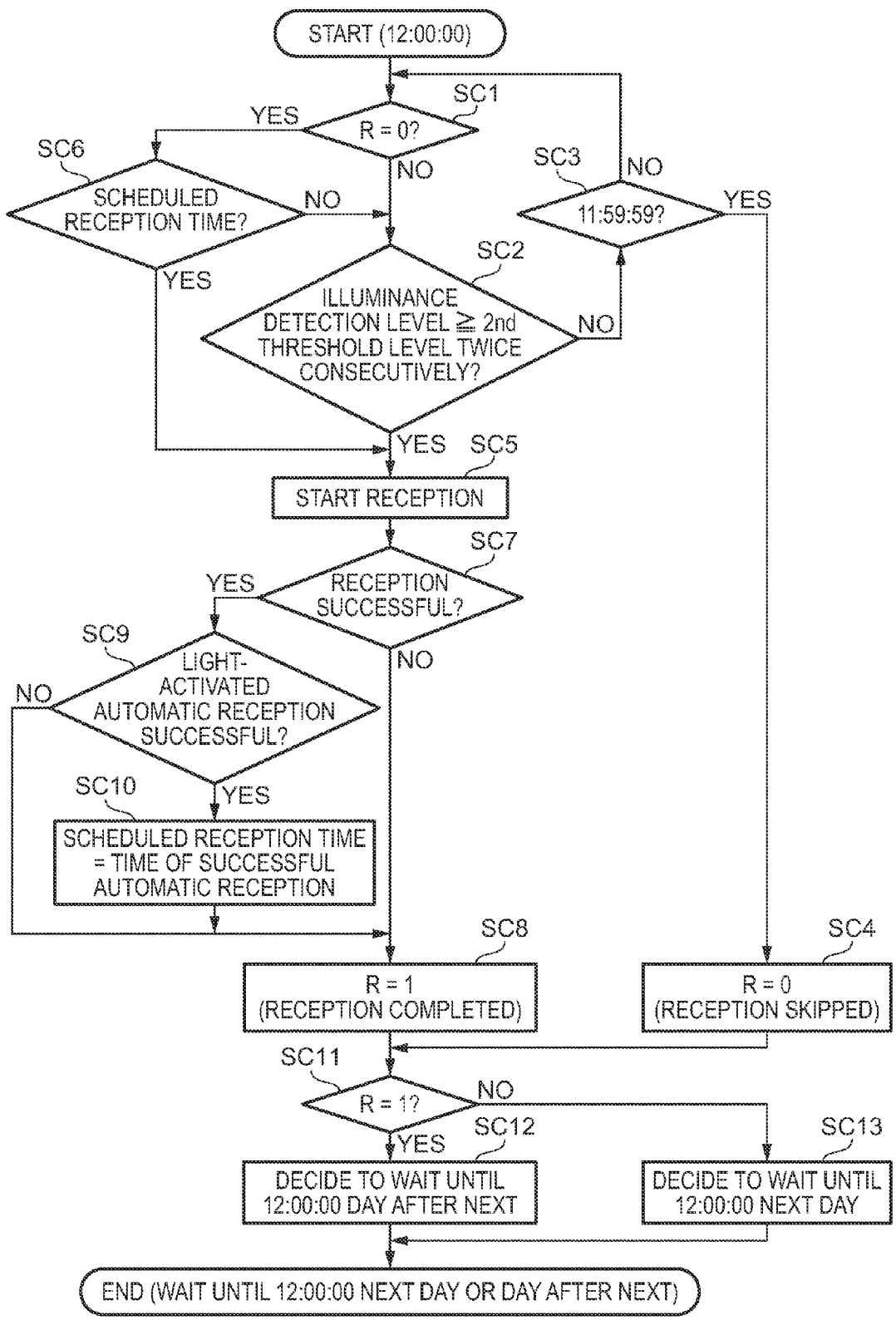
FIG. 9 is a flow chart of a satellite signal reception process executed by the control circuit in a third embodiment of the invention.

FIG. 9 is a flow chart of the satellite signal reception process that is executed by the control circuit in a third embodiment of the invention.

This embodiment differs from the foregoing first embodiment in that: (i) if a satellite signal was received, the restart control time used as the start control time is set to 12:00:00 the day after next, and if a signal was not received, the restart control time is set to 12:00:00 the next day.

Note that steps SC1 to SC10 of the control circuit 40 are the same as steps SA1 to SA10 in the first embodiment.

As shown in FIG. 9, if variable R is set in step SC4 or SC8 while executing steps SC1 to SC10, the control circuit 40 determines if variable R=1 (SC11).

If SC11 returns Yes (a reception process was executed), the control circuit 40 sets the restart control time to 12:00:00 the day after next (SC12), but sets the restart control time to 12:00:00 the next day if No is returned (a reception process was not executed) (SC13).

This third embodiment of the invention has the operating effects described below in addition to the same effects as the first embodiment.

If reception is completed, the control circuit 40 does not start reception again until the restart reception time the day after next, but if a signal is not received, controls reception to start at the restart reception time the next day.

The reception process consumes power from the storage battery 24, decreasing the amount of power left the day after the reception process is performed. As a result, if the reception process is performed on two consecutive days, the power supply could become depleted during reception and reception will be interrupted. Because this embodiment of the invention does not run the reception process the day after the reception process is executed, the storage battery 24 can be recharged the next day, and the chance of reception being interrupted can be reduced.

However, sufficient power remains in the storage battery 24 the day after the reception process is not run. As a result, the reception process can be performed on said next day and the satellite signal can be received promptly without running out of power during reception.

Fourth Embodiment

A fourth embodiment of the invention is described next with reference to the accompanying figures.

Note that the configuration of the electronic device according to this embodiment of the invention is the same as that of the first embodiment, and further detailed description thereof is omitted or simplified.

Figures 10, 11:
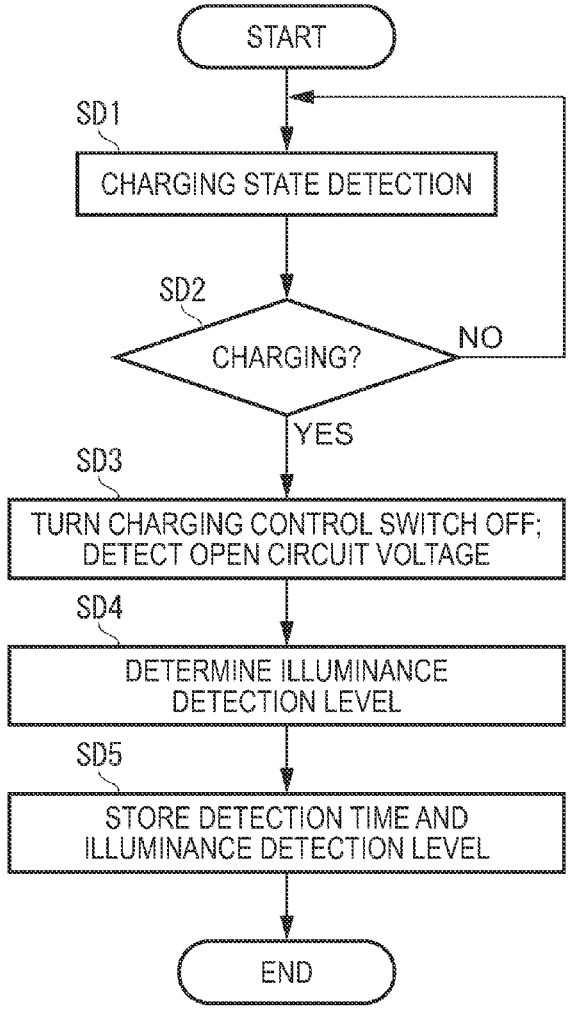
FIG. 10 is a flow chart of the illuminance detection level storage process of the control circuit in a fourth embodiment of the invention.
FIG. 11 shows the relationship between the detection time and detection count at each of the illuminance detection levels used to set the scheduled reception time in the fourth embodiment of the invention.
Figure 12:
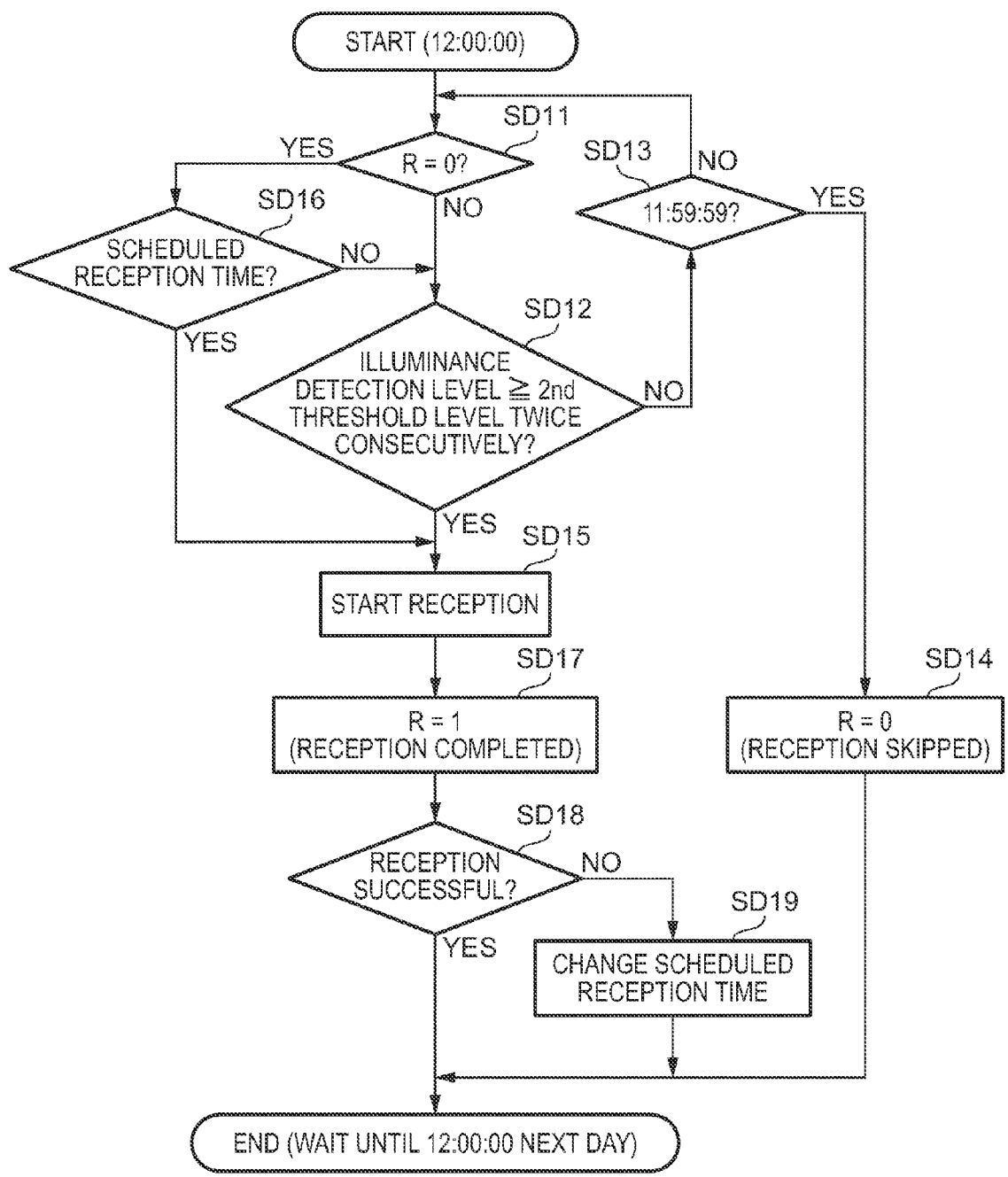
FIG. 12 is a flow chart of a satellite signal reception process executed by the control circuit in fourth and fifth embodiments of the invention.

FIG. 10 is a flow chart of the illuminance detection level storage process of the control circuit in a fourth embodiment of the invention. FIG. 11 shows the relationship between the detection time and detection count at each of the illuminance detection levels used to set the scheduled reception time. FIG. 12 is a flow chart of a satellite signal reception process of the control circuit.

This embodiment differs from the foregoing first embodiment in that: (i) the scheduled reception time is set based on the detection time and detection count of illuminance detection levels detected in the past.

Note that steps SD11 to SD17 of the control circuit 40 are the same as steps SA1 to SA6 and SA8 in the first embodiment.

The control circuit 40 performs an illuminance detection level storage process the first time the electronic device 100 is used, or after a system reset, and stores several days or several hours of data. The illuminance detection level storage process is also performed during the satellite signal reception process as shown in FIG. 12 and described below to accumulate data.

More specifically, the control circuit 40 operates the charge state detection circuit 43 on a regular period at a specific time interval or when the user presses a button (SD1). This regular period may be a period such as 1 second, 5 seconds, 10 seconds, 1 minute, or 30 minutes, for example. The period can be determined based on the storage capacity of the storage unit 60 or consumption of storage battery 24 power. More specifically, if the storage capacity of the storage unit 60 is large, the period could be shortened to store more data so that the scheduled reception time can be set more appropriately as described below. Alternatively, if suppressing consumption of power from the storage battery 24 is desirable, the period can be lengthened. The illuminance detection level storage process can also be blocked during the night because the illuminance detection level detected at night will be low if the user is outdoors.

The control circuit 40 then determines if the battery is being charged (SD2), and if the battery is not being charged (SD2 returns No), returns to SD1. If SD2 determines that charging is in progress (SD2 returns Yes), the control circuit 40 turns the charging control switch 42 off and detects the open circuit voltage corresponding to the illuminance of light incident on the solar cell 22 (SD3).

The control circuit 40 determines the illuminance detection level corresponding to the open circuit voltage based, for example, on the relationship shown in FIG. 7 (SD4), stores this illuminance detection level together with the detection time of this detection level (SD5), and ends the process. More specifically, before storing the illuminance detection time, the control circuit 40 determines which of the plural time periods set at a 1-minute interval contains the detection time, and stores a specific time in that time period as the detection time together with the illuminance detection level. For example, if the illuminance detection time is in the time period from 20:00:00 to 20:00:59, the value of the seconds unit of the time period is dropped and the time of 20:00:00 is stored as the detection time.

Note that this time period is not limited to 1-minute periods, and could be set to a period of 5 minutes, 10 minutes, 15 minutes, or 30 minutes, for example. The detection time is also not limited to dropping the seconds unit, and both the seconds unit and minute unit could be dropped. For example, if the time period is set to 10 minutes, the detection time set for the time period from 19:55:00 to 20:04:59 could be set to the beginning time of 19:55:00 or a middle time of 20:00:00.

If the same combination of illuminance detection level and detection time was previously stored in the storage unit 60, the control circuit 40 increments the detection count of that combination the next time it is stored. If a particular combination of illuminance detection level and detection time has not already been stored in the storage unit 60, the control circuit 40 stores that new combination and sets the detection count to 1.

The control circuit 40 also resorts the data in order of the highest illuminance detection level and highest detection count, and determines the order of priority in which the detection time of the illuminance detection level is set as the scheduled reception time. More specifically, as shown in FIG. 11, the control circuit 40 sorts the data from high to low based on the illuminance detection level, and then sorts entries having the same illuminance detection level from high to low based on the detection count. The order of priority is then set in this order. Note that the order of priority is shown in FIG. 11 with a lower value indicating higher priority.

Note that a configuration that does not store the detection count in the storage unit 60 and stores only the illuminance detection level and detection time, and determines the detection count by counting the number of same combinations of illuminance detection level and detection time, is also conceivable. In addition, the data is sorted in the order of priority in this example, but the order of priority could be set without reordering the data.

As shown in FIG. 12, the control circuit 40 also executes the satellite signal reception process of steps SD11 to SD19. In this process the detection time with the highest priority is set as the scheduled reception time based on the past detection results of the illuminance detection level stored in the storage unit 60. The time 20:00:00 with priority level 1 is therefore set as the scheduled reception time in step SD16 in FIG. 11.

The control circuit 40 then determines if reception was successful after step SD17 (SD18). If SD18 returns Yes, the control circuit 40 does not change the scheduled reception time and enters a standby mode until the restart control time of 12:00:00 the next day.

However, if SD18 returns No, the control circuit 40 changes the scheduled reception time (SD19), and enters the standby mode until 12:00:00 the next day. More specifically, of the detection times other than the detection time set as the scheduled reception time, the control circuit 40 sets the detection time with the highest priority setting (the detection time of the highest illuminance detection level with the highest detection count) as the scheduled reception time. As described above, the control circuit 40 executes the illuminance detection level storage process parallel to the satellite signal reception process. As a result, the control circuit 40 changes the scheduled reception time based on the most recent data. For example, if scheduled reception at the highest priority setting (1) of 20:00:00 in FIG. 11 fails, the time 7:00:00 of the next highest priority setting (2) is set as the scheduled reception time.

This fourth embodiment of the invention has the operating effects described below in addition to the same effects as the first embodiment.

The control circuit 40 stores illuminance detection levels detected in the past together with the detection time of each illuminance detection level in the storage unit 60, and sets the detection time of the highest illuminance detection level as the scheduled reception time.

As a result, scheduled reception is possible at a time when the environment should be relatively free of buildings and other obstructions to satellite signals, and the probability of successful reception can be increased.

Of the detection times of the highest illuminance detection level, the control circuit 40 sets the detection time of the illuminance detection level with the highest detection count as the scheduled reception time.

The probability of successful reception can therefore be increased by attempting reception at the detection time with the highest detection count selected from among the detection times of high illuminance in the past.

The control circuit 40 sets the priority level in which the detection time is set as the scheduled reception time in order of the highest illuminance detection level and highest detection count. If scheduled reception fails, the detection time with the highest priority setting selected from among the detection times other than the detection time set as the scheduled reception time is set as the scheduled reception time, and if scheduled reception succeeds, the scheduled reception time is not changed.

As a result, if reception fails at the time when illuminance was highest in the past because the user's daily pattern changed or the illuminance detection level becomes as high as the outdoors due to the effect of lighting, the next scheduled reception occurs at the time of the next highest illuminance or next highest detection count, and the probability of success in the next scheduled reception can be increased.

Fifth Embodiment

A fifth embodiment of the invention is described next with reference to the accompanying figures.

Note that the configuration of the electronic device according to this embodiment of the invention is the same as that of the first embodiment, the satellite signal reception process of the control circuit in this embodiment is the same as in the fourth embodiment, and further detailed description thereof is omitted or simplified.

Figure 13:
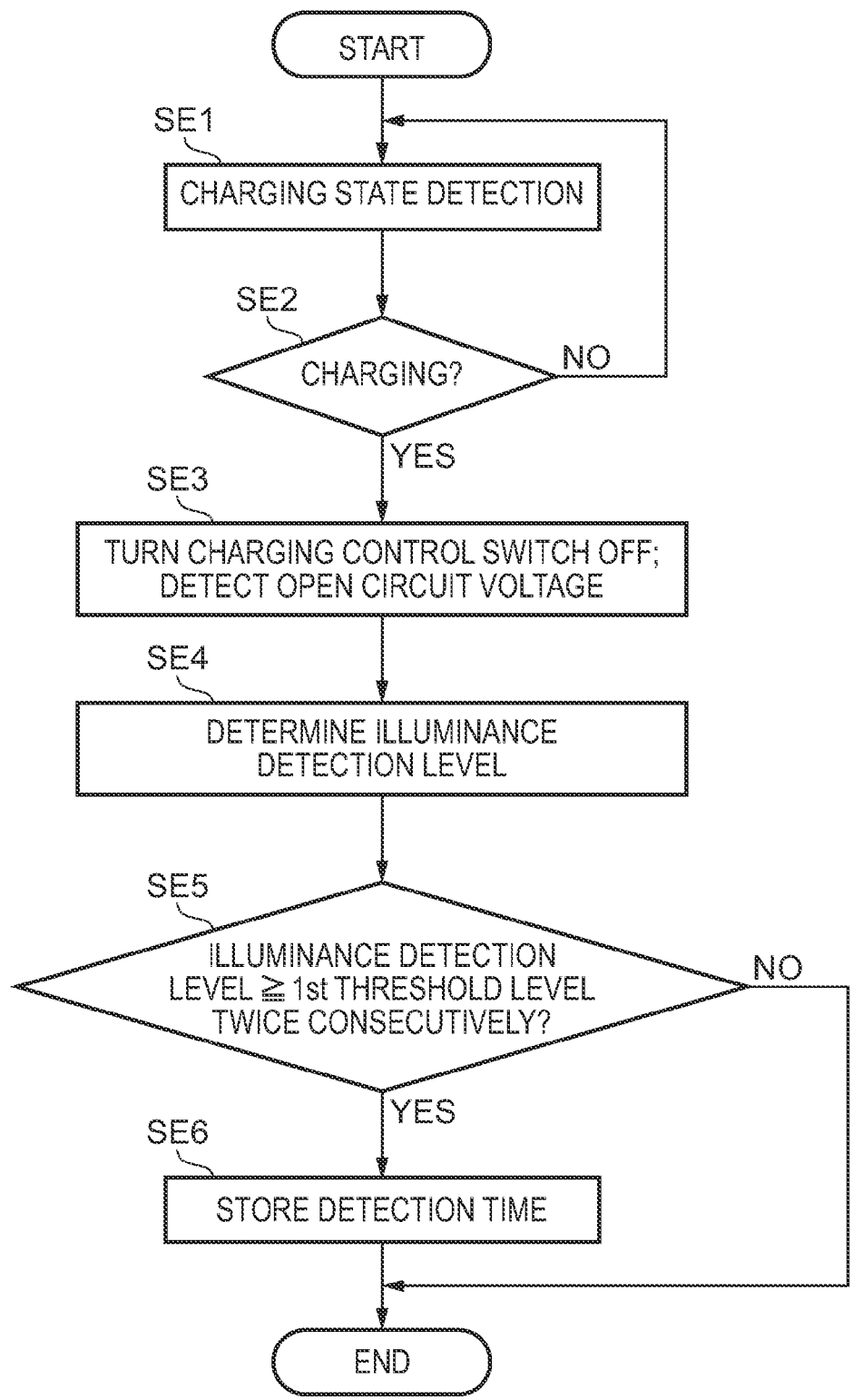
FIG. 13 is a flow chart of the detection time storage process of the control circuit in the fifth embodiment of the invention.

FIG. 13 is a flow chart of the detection time storage process of the control circuit in this fifth embodiment of the invention. FIG. 14 shows the detection counts of the detection times used to set the scheduled reception time.

This embodiment differs from the foregoing fourth embodiment in that: (i) the scheduled reception time is set based on the detection time when the illuminance detection level exceeded a first threshold level used as a first threshold value in the past, and the detection count.

Note that steps SE1 to SE4 of the control circuit 40 are the same as steps SD1 to SD4 in the fourth embodiment.

The control circuit 40 performs a detection time storage process such as shown in FIG. 13 the first time the electronic device 100 is used, or after a system reset, and stores several days or several hours of data. The detection time storage process is also performed during the satellite signal reception process described below to accumulate data.

More specifically, the control circuit 40 executes steps SE1 to SE4, and determines if the illuminance detection level corresponding to the open circuit voltage detected in SE4 is greater than or equal to a first threshold level (such as 5) twice consecutively (SE5). Note that this first threshold level is set based on the relationship shown in FIG. 7, and may be set to a level other than 5.

If the illuminance detection level is determined to not exceed the first threshold level twice consecutively (SE5 returns No), the control circuit 40 ends the process. However, if the illuminance detection level exceeds the first threshold level twice consecutively (SE5 returns Yes), the control circuit 40 stores the detection time of the illuminance detection level determined from the same process as in the fourth embodiment (SE6), and then ends the process. More specifically, if the detection time based on the detection result used in SE5 is already stored in the storage unit 60, the control circuit 40 increases the detection count of that detection time 1. If the detection time based on the detection result used in SE5 is not already stored in the storage unit 60, the control circuit 40 stores the new detection time and sets the detection count to 1.

The control circuit 40 then reorders the data in order of the highest detection count, and sets the priority level for setting the detection time as the scheduled reception time. More specifically, as shown in FIG. 14, the control circuit 40 first sorts the data from high to low by detection count, and sets the priority level in the sorted order. Note that the priority levels shown in FIG. 14 use a lower value to indicate higher priority.

Because the time period and detection times are set in 15-minute increments in this fifth embodiment, the number of scheduled reception times to be managed is smaller than in the fourth embodiment where a 1-minute period is used, and the user can more easily know the scheduled reception time. The storage capacity of the storage unit 60 can also be reduced.

The control circuit 40 also executes the satellite signal reception process of steps SD11 to SD10 as shown in FIG. 12. In this embodiment, the control circuit 40 sets the detection time with the highest detection count as the scheduled reception time used for evaluation in SD11 based on the past detection results stored in the storage unit 60.

To change the scheduled reception time in SD19, the control circuit 40 sets the detection time with the highest priority (highest detection count) selected from among the detection times other than the detection time currently set as the scheduled reception time as the scheduled reception time. Because the control circuit 40 executes the illuminance detection level storage process parallel to the satellite signal reception process as described above, the scheduled reception time is changed based on the newest data.

This fifth embodiment of the invention has the operating effects described below in addition to the same effects as the first and fourth embodiments.

When the illuminance detection level is greater than or equal to a first threshold level twice consecutively, the control circuit 40 sets the detection time of that detection level as the scheduled reception time.

As a result, the probability of successful reception can be increased by selecting for reception a time when the illuminance detection level equalled or exceeded the first threshold level in the past. In addition, by setting a value enabling detecting that the user is outdoors as the first threshold level, scheduled reception is possible timed to when the user is outdoors.

If the illuminance detection level is greater than or equal to the first threshold level twice consecutively, the control circuit 40 stores the detection count with the detection time of the illuminance detection level. The control circuit 40 then sets the detection time with the highest detection count as the scheduled reception time.

As a result, by performing scheduled reception at the time with the highest detection count, reception can be timed to when the likelihood is high that the user is outdoors and the probability of reception succeeding can be increased, even when there are plural times when the illuminance detection level exceeded the first threshold level in the past.

Other Embodiments

The invention is not limited to the foregoing embodiments, and can be varied in many ways without departing from the scope of the invention.

For example, the scheduled reception time could be set based on a relationship such as shown in FIG. 15 in the first to third embodiments (first variation).

More specifically, before executing the satellite signal reception process shown in FIG. 4, FIG. 8, or FIG. 9, the control circuit 40 stores the time that light-activated automatic reception or manual reception succeeded in the past linked to the order of success in the storage unit 60. This example stores a maximum of 10 reception success times, but the maximum is not limited to 10. In the example shown in FIG. 15, the reception success time at number 1 in the order of success is the newest time, and 10 indicates the tenth-newest time. The control circuit 40 first sets the first newest time of 6:10:00 as the scheduled reception time, starts the next scheduled reception at the same time if scheduled reception is successful at this time, and if reception fails at this time, could set the second-newest time of 6:15:00 as the scheduled reception time for the next reception.

The scheduled reception time could also be set based on a relationship such as shown in FIG. 16 in the first to third embodiments (second variation).

More specifically, the control circuit 40 stores the number of times light-activated automatic reception and manual reception were performed in each time period in the past and the number of times reception succeeded in the storage unit 60. The control circuit 40 then first sets the time 6:00:00 with the first-highest successful reception count as the scheduled reception time, and starts the next scheduled reception at the same time if scheduled reception succeeds at that time. If reception fails, however, the control circuit 40 sets the time 8:00:00 with the second-highest successful reception count as the next scheduled reception time.

As a result, because reception is performed next at the time with the next highest success count if reception fails at the time with the highest success count in the past, the probability of success in the next reception process can be increased when the user's daily pattern has changed, for example.

Note that the scheduled reception time could be set in order based on the success rate (successful reception count/reception count) or the failure rate instead of the successful reception count.

Reception could also be scheduled in the first to fifth embodiments and the first and second variations described above with additional consideration for a relationship such as shown in FIG. 17 (third variation).

More specifically, the control circuit 40 stores the number of times reception succeeded in light-activated automatic reception or manual reception processes in the past on each day of the week. The control circuit 40 then schedules reception only on Monday, the day with the highest success count in this example, and if scheduled reception succeeds, schedules the next reception only on the same day. If reception fails, the control circuit 40 schedules reception next only on Friday, the day with the second-highest number of successes.

Further alternatively, if the satellite signal reception process fails once in the first to fifth embodiments and the first to third variations, the reception process could be executed after a specific time of 1 minute, 10 minutes, or 30 minutes, for example, passes, and the reception process could be ended once reception fails a specific number of times.

Further alternatively, a time selected by the user from among plural times stored in the storage unit 60 could be set as the scheduled reception time in the fourth and fifth embodiments and the first to third variations described above.

Yet further alternatively, when scheduled reception fails in the fourth and fifth embodiments and the first to third variations described above, the control circuit 40 could omit that scheduled reception time from the candidates for setting the next scheduled reception time.

By removing the time at which reception fails from the candidate times for setting the next reception time, this configuration can reduce the probability that reception will fail because the user is indoors at a time when reception succeeded in the past as a result of the user's daily pattern changing, for example.

The satellite signal reception process starts based on the illuminance detection level above, but a configuration that uses detection of humidity, temperature, or atmospheric pressure as the outdoor detection circuit, and determines the device is outdoors and starts the satellite signal reception process when the humidity, temperature, or atmospheric pressure exceeds a specific level, is also conceivable. This is useful when the satellite signal reception device is used in mountain climbing because atmospheric pressure is significantly different at high and low altitudes.

The second embodiment could also store both the success times of light-activated automatic reception and the success times of manual reception in the storage unit 60, and set the most recent success time as the scheduled reception time.

This configuration can schedule reception based on the user's most recent pattern of daily life. The methods of setting the scheduled reception time described in the first, second, fourth, and fifth embodiments could also be combined as needed, and the time selected by the method of the first, second, fourth, or fifth embodiment could be set as the scheduled reception time based on a specific condition.

The scheduled reception time could also be changed even if satellite signal reception process fails in the fourth and fifth embodiments.

A specific time set for a predetermined time period is stored as the detection time in the storage unit 60 in the first to fifth embodiments, but the reception success time and illuminance detection time could be stored directly.

Furthermore, in the fifth embodiment the first threshold level may be higher than the second threshold level or lower instead of setting the first threshold level and second threshold level to the same level.

For example, the following effect can be expected if the first threshold level is higher than the second threshold level. That is, by setting the first threshold level to a level corresponding to outdoors on a clear day (a "high illuminance level" below), a time when the user is outdoors can be reliably set as the scheduled reception time.

If the second threshold level is set to the same high illuminance level as the first threshold level, and the user is outdoors at the scheduled reception time but illuminance of the high illuminance level cannot be detected because it is cloudy or raining, or the electronic device 100 is covered by a sleeve, starting the reception process may not be possible because the illuminance detection level will not go to or above the second threshold level.

However, if the second threshold level is set lower than the first threshold level and the user is outdoors at the scheduled reception time, the illuminance detection level will be able to go to the second threshold level or above even if it is cloudy or raining, or the electronic device 100 is covered by a sleeve, and the reception process can be started.

Opportunities for reception at a time when the user is reliably outdoors can therefore be increased, and satellite signals can be received frequently with a high probability of success.

The illuminance detection circuit in the foregoing embodiments outputs a detection value that rises as the illuminance of light incident on the solar cell 22 increases, but the output value is not limited to a value that rises as the illuminance of light incident on the solar cell 22 increases. More specifically, the detection value could be a value that decreases as the illuminance of light incident on the solar cell 22 increases. An example of a case in which the detection value decreases as the illuminance of light incident on the solar cell 22 increases is when a device in which the open circuit voltage decreases as the illuminance of light incident on the solar cell 22 increases is used.

An electronic device 100 having a satellite signal receiving device according to the invention is not limited to a wristwatch (electronic timepiece), and the invention can be used in a wide range of devices that are driven by a storage battery and receive satellite signals sent from positioning information satellites, including cellular phones and mobile GPS receivers used for mountain climbing, for example.

Furthermore, by using a solar cell 22, storage battery 24, charging control switch 42, and voltage detection circuit 44, the invention can highly accurately detect the illuminance of light incident to the solar cell 22. The illuminance detection mechanism thus rendered is also not limited to use only in satellite signal receiving devices, and can be used in other devices. The invention is particularly suited to devices that start some other device by detecting illuminance. For example, the invention can be applied in devices that turn lights on/off or adjust the brightness of lighting according to the detected illuminance, and in long-wave radio-controlled timepieces that start reception according to the illuminance. The satellite signal reception device according to the invention can also be used in electronic devices that only use the solar cell 22 for illuminance detection.

What is claimed is:

1. A satellite signal reception device, comprising:
a reception circuit that receives satellite signals;
an outdoor detection circuit; and
a control circuit that controls the reception circuit and the outdoor detection circuit,
operates the reception circuit when the control circuit determines the satellite signal reception device is outdoors based on a detection result from the outdoor detection circuit, and
operates the reception circuit at a preset scheduled reception time when an indoor state in which the satellite signal reception device is determined not to be outdoors continues for a preset specific time or longer.

2. The satellite signal reception device described in claim 1, wherein:
the control circuit stops operation of the outdoor detection circuit when the indoor state continues for the specific time or longer, and operates the reception circuit at the scheduled reception time.

3. The satellite signal reception device described in claim 1, wherein:
after operating the reception circuit, the control circuit operates the reception circuit when the satellite signal reception device is determined to be outdoors instead of operating the reception circuit at the scheduled reception time even if the indoor state continues for the specific time or longer.

4. The satellite signal reception device described in claim 1, wherein:
the control circuit sets the time that satellite signal reception performed when the satellite signal reception device is determined to be outdoors succeeds as the scheduled reception time.

5. The satellite signal reception device described in claim 4, further comprising:
a storage unit;
wherein the control circuit stores the reception success time in the storage unit, and
when a plurality of reception success times are stored, sets the success time with the highest reception success count as the scheduled reception time.

6. The satellite signal reception device described in claim 5, wherein:
when satellite signal reception fails at the scheduled reception time, the control circuit sets the success time with the highest success count selected from among the success times other than the success time that was set as the scheduled reception time as the scheduled reception time, and does not change the scheduled reception time when satellite signal reception at the scheduled reception time succeeds.

7. The satellite signal reception device described in claim 4, wherein:

the control circuit determines which of plural time periods set at a specific time interval contains the success time, and sets a specific time in the time period containing the success time as the scheduled reception time.

8. The satellite signal reception device described in claim 1, wherein:

the control circuit operates the reception circuit when a manual reception command is asserted, and sets the time that satellite signal reception initiated by a manual reception command succeeded as the scheduled reception time.

9. The satellite signal reception device described in claim 1, wherein:

the control circuit starts controlling the reception circuit and outdoor detection circuit at a preset start control time, starts control at the next start control time if the reception circuit is not operated before the next start control time, and if the reception circuit is operated, starts control at a start control time after a predetermined time passes from the next control start time.

10. The satellite signal reception device described in claim 1, further comprising:

a solar cell;

an illuminance detection circuit that detects the illuminance of light incident on the solar cell; and a storage unit;

wherein the control circuit operates the illuminance detection circuit at a specific time interval, stores the illuminance detected by the illuminance detection circuit and the detection time of the illuminance in the storage unit, and sets the detection time of the highest illuminance in a specific period as the scheduled reception time.

11. The satellite signal reception device described in claim 10, wherein:

when there are plural detection times for the highest detected illuminance, the control circuit sets the detection time of the illuminance that was detected the most times as the scheduled reception time.

12. The satellite signal reception device described in claim 10, wherein:

the control circuit determines which of plural time periods set at a specific time interval contains the detection time, and stores a specific time in the time period containing the detection time in the storage unit.

13. The satellite signal reception device described in claim 1, further comprising:

a solar cell;

an illuminance detection circuit that detects the illuminance of light incident on the solar cell; and a storage unit;

wherein the control circuit operates the illuminance detection circuit at a specific time interval, stores the detection time of the illuminance detected by the illuminance detection circuit in the storage unit when the detected illuminance is greater than or equal to a preset first threshold value, and sets the detection time stored in the storage unit as the scheduled reception time.

14. The satellite signal reception device described in claim 13, wherein:

when plural detection times are stored, the control circuit sets the detection time at which the illuminance was detected the most times as the scheduled reception time.

15. The satellite signal reception device described in claim 1, further comprising:

a solar cell;

wherein the outdoor detection circuit is an illuminance detection circuit that detects the illuminance of light incident on the solar cell as the detection process detecting if the satellite signal reception device is outdoors; and the control circuit determines that the satellite signal reception device is outdoors when the illuminance detected by the illuminance detection circuit is greater than or equal to a preset second threshold value, and determines the satellite signal reception device is not outdoors when the detected illuminance is less than the second threshold value.

16. A satellite signal reception method, comprising steps of:

detecting whether or not a satellite signal reception device is outdoors;

receiving the satellite signal when the satellite signal reception device is determined to be outdoors; and receiving the satellite signal at a preset scheduled reception time when an indoor state in which the satellite signal reception device is determined to not be outdoors continues for a preset specific time or longer.

17. An electronic device comprising:

the satellite signal reception device described in claim 10; and a battery that stores electrical energy converted by the solar cell;

wherein the reception circuit, illuminance detection circuit, and control circuit are driven by electrical energy stored in the battery.

* * * * *